United States Patent
Chen et al.

(10) Patent No.: US 9,674,519 B2
(45) Date of Patent: Jun. 6, 2017

(54) MPEG FRAME COMPATIBLE VIDEO CODING

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 756 days.

(21) Appl. No.: 14/074,281

(22) Filed: Nov. 7, 2013

(65) Prior Publication Data
US 2014/0133556 A1 May 15, 2014

Related U.S. Application Data

(60) Provisional application No. 61/724,885, filed on Nov. 9, 2012, provisional application No. 61/750,289, filed on Jan. 8, 2013.

(51) Int. Cl.
*H04N 7/26* (2006.01)
*H04N 19/117* (2014.01)
(Continued)

(52) U.S. Cl.
CPC ..... *H04N 19/00066* (2013.01); *H04N 19/117* (2014.11); *H04N 19/187* (2014.11);
(Continued)

(58) Field of Classification Search
None
See application file for complete search history.

(56) References Cited

U.S. PATENT DOCUMENTS

2008/0117985 A1* 5/2008 Chen .................... H04N 19/597
375/240.26
2010/0061452 A1* 3/2010 Pandit .................... H04N 19/61
375/240.12
(Continued)

FOREIGN PATENT DOCUMENTS

WO 2008088497 A2 7/2008
WO 2012036901 A1 3/2012

OTHER PUBLICATIONS

Tech G et al. "MV-HEVC Draft Text 2", 2. JCT-3V Meeting; 102. MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG. 16); URL: http://phenix.int-evry.fr/jct2/, No. JCT3V-B1004, Nov. 7, 2012, XP030130413.*

(Continued)

*Primary Examiner* — William C Vaughn, Jr.
*Assistant Examiner* — Stuart Bennett
(74) *Attorney, Agent, or Firm* — Shumaker & Sieffert, P.A.

(57) ABSTRACT

In an example, a video coder may determine a first layer component of a first layer of video data, wherein the first layer of video data is associated with a layer identifier. The video coder may generate at least one filtered layer component by filtering the first layer component, and assign the layer identifier of the first layer and a filtered layer component index to the at least one filtered layer component, where the filtered layer component index is different than a layer component index of the first layer component. The video coder may also add the at least one filtered layer component to a reference picture set for performing inter-layer prediction of a layer other than the first layer of video data.

30 Claims, 10 Drawing Sheets

US 9,674,519 B2

Page 2

(51) Int. Cl.
*H04N 19/597* (2014.01)
*H04N 19/70* (2014.01)
*H04N 19/30* (2014.01)
*H04N 19/187* (2014.01)

(52) U.S. Cl.
CPC ........... *H04N 19/30* (2014.11); *H04N 19/597* (2014.11); *H04N 19/70* (2014.11)

(56) References Cited

U.S. PATENT DOCUMENTS

| | | | |
|---|---|---|---|
| 2012/0027079 A1* | 2/2012 | Ye | H04N 19/597 375/240.02 |
| 2012/0183077 A1 | 7/2012 | Hong et al. | |
| 2012/0236115 A1 | 9/2012 | Zhang et al. | |
| 2013/0259393 A1* | 10/2013 | Deshpande | G06T 9/00 382/232 |
| 2014/0354770 A1* | 12/2014 | Suh | H04N 21/4345 348/42 |

OTHER PUBLICATIONS

ITU-T H.264 (Jan. 2012).*
ITU-T H.264 (Jun. 2011).*
Boyce et al., "3D-HEVC HLS: Parameter sets modifications for extension hooks," MPEG Meeting; Geneva; (Motion Picture Expert Group or ISO/IEC JTC1/SC29/WG11), No. m24714, May 2012, 9 pp.
Boyce et al., "High level syntax hooks for future extensions," JCT-VC Meeting; MPEG Meeting; San Jose; (Joint Collaborative Team on Video Coding of ISO/IEC JTC1/SC29/WG11 and ITU-T SG.16); URL: http:// wftp3. itu.int/av-arch/jctvc-site/, No. JCTVC-H0388, Feb. 1-10, 2012, 8 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Choi et al., "AHG9: On frame packing arrangement SEI," JCT-VC Meeting; MPEG Meeting; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0247, Jul. 11-20, 2012, 5 pp.

International Preliminary Report on Patentability—PCT/US2013/069244—The International Bureau of WIPO Geneva, Switzerland, Feb. 9, 2015, 12 pp.
International Search Report and Written Opinion—PCT/US2013/069244—ISA/EPO—Feb. 10, 2014, 15 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sjoberg et al., "Absolute signaling of reference pictures," JCT-VC Meeting; MPEG Meeting; Torino; (Joint Collaborative Team on Video Coding of ISO/IEC JTC1/SC29/WG11 and ITU-T SG.16); URL: http://wftp3.itu.int/av-arch/jctvc-site/., No. JCTVC-F493, Jul. 22, 2011, 10 pp.
Tech et al., "MV-HEVC Draft Text 2," JCT-3V Meeting; MPEG Meeting; Shanghai; (The Joint Collaborative Team on 3D Video Coding Extension Development of ISO/IEC JTC1/SC29/WG11 and ITU-T SG.16); URL:http://phenix.int-evry.fr/jct2/, No. JCT3v-B1004_d0, Oct. 13-19, 2012, 22 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Yin et al., "Description of MFC Video Coding Technology Proposal by Dolby," MPEG Meeting; Shanghai; (Motion Picture Expert Group or ISO/IEC JTC1/SC29/WG11), No. m26661, Oct. 14, 2012 38 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2010, 674 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
Second Written Opinion of International Application No. PCT/US2013/069244, mailed Nov. 25, 2014, 16 pp.
Response to Written Opinion mailed Feb. 10, 2014, from International Application No. PCT/US2013/069244, dated Sep. 8, 2014, 22 pp.
Response to Second Written Opinion mailed Nov. 25, 2014, from International Application No. PCT/US2013/069244, dated Jan. 23, 2015, 20 pp.
"Call for Proposals on MFC," ISO/IEC JTC1/SC29/WG11, MPEG2012/N12961, Video and Requirement, Jul. 2012, 18 pp.
Yin et al., "Description of MFC Video Coding Technology Proposal by Dolby," ISO/IEC JTC1/SC29/WG11, MPEG2012/M26661, Oct. 2012, 20 pp.

* cited by examiner

MPEG FRAME COMPATIBLE VIDEO CODING

This disclosure claims the benefit of U.S. Provisional Application No. 61/724,885 filed Nov. 9, 2012, and U.S. Provisional Application No. 61/750,289 filed Jan. 8, 2013, the contents of both of which are incorporated herein by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform, coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data. The techniques of this disclosure include support for enhanced resolution pictures in 3D coding. For example, aspects of this disclosure relate to MPEG Frame-Compatible (MFC) stereoscopic 3D video coding enhancement technology. Certain aspects of this disclosure include techniques for reference picture list construction and decoded picture management for MFC coding. The techniques of this disclosure may also provide a framework for enabling MFC to use an existing ITU-T H.264 Muitiview Video Coding (MVC) framework with few or no changes to the MVC specification. In addition, while certain aspects are described with respect to MVC, the techniques described herein may be extended to a variety of other coding frameworks, as described in greater detail below.

In an example, a method of coding multilayer video data includes determining a first layer component of a first layer of video data, wherein the first layer of video data is associated with a layer identifier, generating at least one filtered layer component by filtering the first layer component, assigning the layer identifier of the first layer and a filtered layer component index to the at least one filtered layer component, wherein the filtered layer component index is different than a layer component index of the first layer component, and adding the at least one filtered layer component to a reference picture set for performing inter-layer prediction of a layer other than the first layer of video data.

In another example, an apparatus for coding multi-layer view data includes one or more processors configured to determine a first layer component of a first layer of video data, wherein the first layer of video data is associated with a layer identifier, generate at least one filtered layer component by filtering the first layer component, assign the layer identifier of the first layer and a filtered layer component index to the at least one filtered layer component, wherein the filtered layer component index is different than a layer component index of the first layer component, and add the at least one filtered layer component to a reference picture set for performing inter-layer prediction of a layer other than the first layer of video data.

In another example, an apparatus for coding multi-layer view data includes means for determining a first layer component of a first layer of video data, wherein the first layer of video data is associated with a layer identifier, means for generating at least one filtered layer component by filtering the first layer component, means for assigning the layer identifier of the first layer and a filtered layer component index to the at least one filtered layer component, wherein the filtered layer component index is different than a layer component index of the first layer component, and means for adding the at least one filtered layer component to a reference picture set for performing inter-layer prediction of a layer other than the first layer of video data.

In another example, a non-transitory computer-readable medium storing instructions that, when executed, cause one or more processors to determine a first layer component of a first layer of video data, wherein the first layer of video data is associated with a layer identifier, generate at least one filtered layer component by filtering the first layer component, assign the layer identifier of the first layer and a filtered layer component index to the at least one filtered layer component, wherein the filtered layer component index is different than a layer component index of the first layer component, and add the at least one filtered layer component to a reference picture set for performing inter-layer prediction of a layer other than the first layer of video data.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
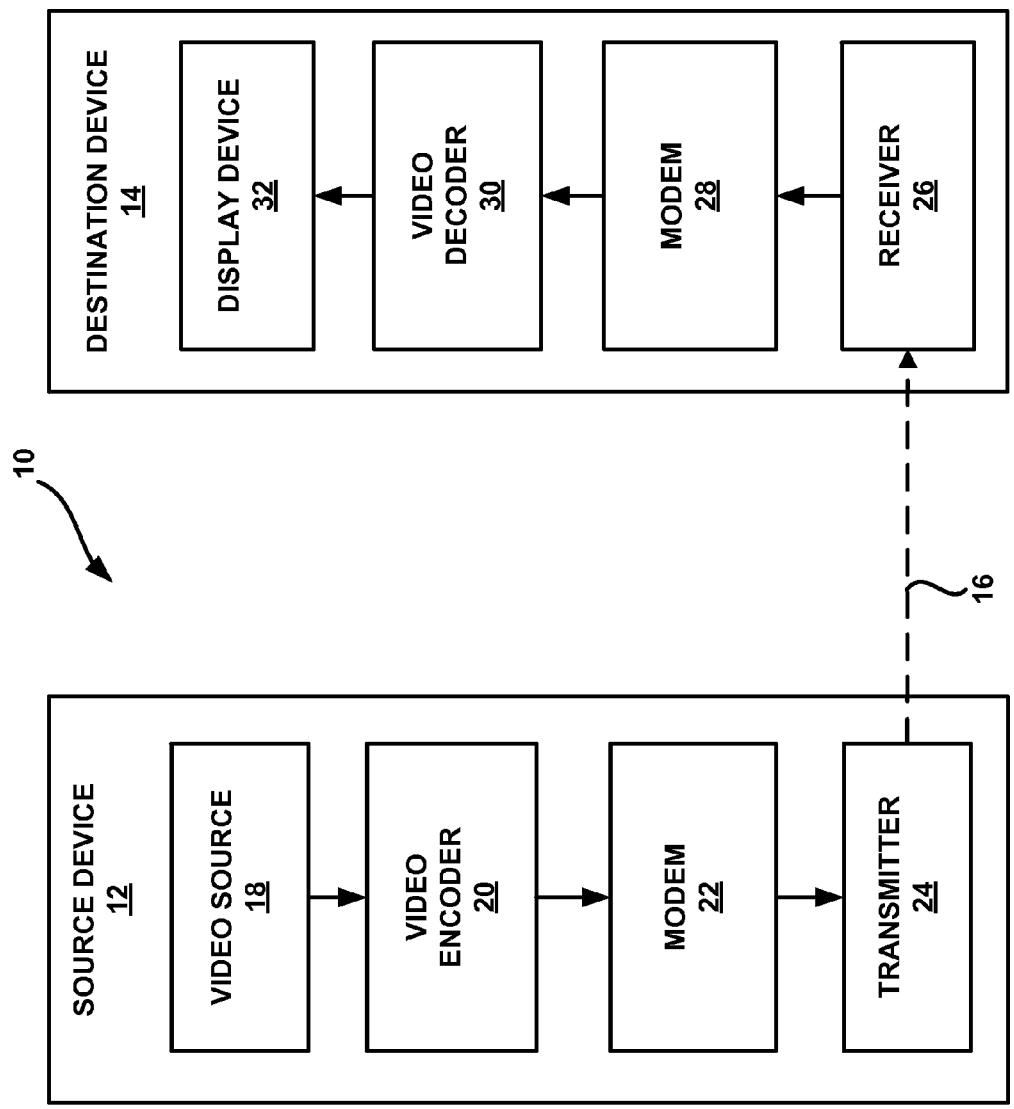
FIG. 1 is a block diagram illustrating an example video encoding and decoding system that may utilize the techniques described in this disclosure.

According to certain video coding systems, motion estimation and motion compensation may be used to reduce the temporal redundancy in a video sequence, so as to achieve data compression. In this case, a motion vector can be generated that identifies a predictive block of video data, e.g., a block from another video picture or slice, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

Multiview Video Coding (MVC) is an extension of the ITU-T H.264/MPEG-4 Advanced Video Coding (AVC) video coding standard for encapsulating multiple views of video data. In general, each view corresponds to a different perspective, or angle, at which corresponding video data of a common scene was captured. The coded views can be used for three-dimensional (3D) display of video data. For example, two views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

In MVC, a particular picture of a particular view is referred to as a view-component. That is, a view component of a view corresponds to a particular temporal instance of the view. Multi-view video may contain a relatively large amount of inter-view statistical dependencies, as all cameras used to capture the multi-view data capture the same scene from different viewpoints. Such dependencies can be exploited for combined temporal and/or inter-view prediction, where images are not only predicted from temporally neighboring images, but also from corresponding images from other views. That is, inter-view prediction may be performed among pictures in the same access unit (i.e., within the same time instance).

Inter-view prediction is generally realized as if the view component in another view is an inter prediction reference. Rather than using "motion" vectors for prediction, inter-view prediction utilizes "displacement" vectors, which are conceptually similar to motion vectors but describe displacement rather than motion. The potential inter-view references are signaled in the Sequence Parameter Set (SPS) MVC extension and can be modified by the reference picture list construction process, which enables flexible ordering of the inter prediction or inter-view prediction references.

While inter-view prediction is described above with respect to MVC, in some instances, inter-view prediction may be performed in other multilayer video coding architectures. For example, with respect to scalable video coding (such as a scalable video codec based on High Efficiency Video Coding (HEVC), referred to herein as HSVC (High Efficiency Scalable Video Coding or SHVC (Scalable High Efficiency Video Coding), as described in greater detail below) view scalability and/or spatial scalability may contribute to three dimensional video services, as such scalabilities allow for backward-compatible extensions for more views, and/or enhancing the resolution of views in a way that allows decoding by legacy devices.

Thus, for three-dimensional video data, such as multiview or scalable coded data, blocks may also be inter-view and/or inter-layer predicted. As described herein, a video "layer" may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data.

Accordingly, this disclosure may interchangeably refer to a layer and a view of video data. That is, a view of video data may be referred to as a layer of video data, and vice versa. Moreover, the terms inter-view prediction and inter-layer prediction may interchangeably refer to prediction between multiple layers and/or views of video data. A layer component may generally refer to a view component of multiview video data and a scalable representation (also referred to as a layer representation) of scalable video data. In addition, multi-layer codec (or multi-layer video coder) may jointly refer to a multiview codec or a scalable codec.

Video data, including multiview and scalable video data, may be organized into Network Abstraction Layer (NAL) units, which provide a "network-friendly" video representation to address applications such as video telephony, storage, broadcast, or streaming. For example, a video encoder commonly encodes each picture of video data as one or more independently decodable slices. The slices may be packaged into NAL units for transmission across the network. NAL units including video coding layer (VCL) data may include data for a picture or data for a slice of a picture. For example, NAL units may include syntax information such as coded block pattern (CBP) values, block type, coding mode, maximum block size for a coded unit (such as a frame, slice, block, or sequence), or other information.

Each NAL unit includes a header that identifies a type of data stored in the NAL unit. An example MVC NAL unit header may include syntax elements indicating a view identifier for the view to which the NAL unit belongs, whether the NAL unit belongs to a so-called anchor picture that can be used as a random access point (for reference by other view components), whether the NAL unit is used for inter-view prediction for NAL units in other views, and a variety of other information. As described herein, an anchor picture may generally correspond to a random access point (RAP) picture, and such terms may be used interchangeably. That is, "random access" generally refers to the act of starting a decoding process for a bitstream at a point other than the beginning of the stream. A random access picture generally relates to a picture that contains only intra-coded slices (I-slices). Coded pictures that follow a random access picture in both decoding order and output order are not predicted from pictures preceding the random access picture, either in decoding order or output order.

In general, an access unit may include all view components of a particular time instance. A particular view component includes all NAL units of a particular view at a particular time instance. An MVC NAL unit may contain a one byte NAL unit header (including the NAL unit type) and may further include a MVC NAL unit header extension.

The Joint Technical Committee (JTC) of the International Organization for Standardization (ISO) and the International Electrotechnical Commission (IEC) recently issued a Call for Proposals (CfP) on MPEG Frame-Compatible (MFC) Enhancement technology ("Call for Proposals on MFC," ISO/IEC JTC1/SC29/WG11 MPEG2012/W12961, Stockholm, July 2012, available publicly at http://mpeg.chiariglione.org/sites/default/files/files/standards/parts/docs/w12961.zip) (hereinafter "the call for proposals"). The call for proposals was directed to an MFC architecture that would provide efficient compression and reconstruction of full resolution stereo video with backward compatibility with AVC frame compatible bitstreams.

For example, the call for proposals stated that "a number of satellite, terrestrial broadcasters, cable and IPTV service providers have started deploying stereoscopic 3D video services using AVC in a manner known as frame-compatible coding. In the longer term, it is clearly desirable for them to provide higher resolution video services than those provided by the frame-compatible approach alone whilst maintaining backward compatibility." The call for proposals also stated that "enhancement of frame compatible signals allows the broadcasters and service providers the flexibility of incrementally migrating to a higher resolution service in the future when it makes economic sense. In other words, this flexibility allows the broadcasters and service providers to deploy frame-compatible stereoscopic 3D video services in the near term that will remain compatible after the migration to higher resolution." The call for proposals also stated that "if the higher quality and frame-compatible services use completely separate encoding, the resulting total bit rate to be delivered over the transmission channel could be excessive. To reduce the necessary bit rate, it may be desirable to design the encoding structure to use a scalable encoding approach—also referred to as a layered encoding approach."

In response to the call for proposals, a proposed MFC solution was submitted ("Description of MFC Video Coding Technology Proposal by Dolby," ISO/IEC JTC1/SC29/WG11 MPEG2012/M26661, October 2012, Shanghai, China) (hereinafter "the M26661 proposal"). While the M26661 proposal generally describes an MFC architecture for performing enhanced resolution coding, the proposed MFC architecture lacks efficient support for reference picture management. Moreover, as discussed in greater detail below, the proposed MFC architecture lacks details with respect to a number of syntax elements associated with the MVC framework (e.g., as specified in the latest joint draft of MVC, "Advanced video coding for generic audiovisual services," ITU-T Recommendation H.264, March, 2010), upon which the proposed MFC architecture is built.

The techniques of this disclosure include support for enhanced resolution pictures in 3D coding. For example, aspects of this disclosure relate to MPEG Frame-Compatible (MFC) stereoscopic 3D video coding enhancement technology. Certain aspects of this disclosure include techniques for reference picture list construction and decoded picture management for enhanced resolution coding, such as MFC coding. The techniques of this disclosure may also provide a more complete framework for enabling MFC to use the existing MVC framework with few or no changes to the MVC specification. In addition, while certain aspects are described with respect to MVC, the techniques described herein may be extended to a variety of other coding frameworks, as described in greater detail below.

FIG. 1 is a block diagram illustrating an example video encoding and decoding system 10 that may utilize techniques for motion vector prediction in multiview coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multiview coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for motion vector prediction in multi-view coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video coding standard, such as the ITU-T H.264/MPEG-4 (AVC) standard. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on extensions to H.264/MPEG-4 AVC. For example, video encoder 20 and video decoder 30 may operate according to an extension of the H.264/AVC standard, such as MVC, Scalable Video Coding (SVC), or MPEG Frame Compatible (MFC) video coding. The techniques of this disclosure, however, are not limited to any particular coding standard. Other examples of video coding standards include MPEG-2 and ITU-T H.263. High Efficiency Video Coding (HEVC) and its extensions including, for example, a multiview extension of HEVC, referred to as MV-HEVC, a depth-enhanced HEVC-based full 3DV codec, referred to as 3D-HEVC, and a scalable video codec based on HEVC, referred to as HSVC (high efficiency scalable video coding, or, alternatively, SHVC (scalable high efficiency video coding)). As described in greater detail below, the techniques of this disclosure may be implemented with any combination of the standards noted above, as well as future standards that have not yet been developed.

With respect to the base HEVC standard, the HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right," Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

In general, a TU is used for the transform and quantization processes. A given CU having one or more PL's may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

In any case, a video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an w-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some examples, video encoder 20 may generate and video decoder 30 may receive certain parameter sets, which may be used when decoding video data. For example, parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence (e.g., sequence of pictures) or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as Supplemental Enhancement Information (SEI) NAL units.

SEI NAL units (referred to as SEI messages) may contain information that is not necessary for decoding the coded pictures samples from VCL NAL units, but may assist in processes related to decoding, display, error resilience, and other purposes. SEI messages may be contained in non-VCL NAL units. SEI messages may be included in the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC.

In some examples, video encoder 20 may encode an MVC bitstream that conforms to the MVC extension to H.264/AVC. Likewise, video decoder 30 may decode an MVC bitstream that conforms to the MVC extension to H.264/AVC. In the scalable extension of H.264/AVC, syntax elements may be added in the NAL unit header extension to extend the NAL unit header from one byte to four bytes to describe the characteristics of a VCL NAL unit in multiple dimensions. A VCL NAL unit in HEVC may include a longer NAL unit header than the NAL unit header in the H.264/AVC standard.

An MVC NAL unit may contain a one byte NAL unit header that includes the NAL unit type, as well as an MVC NAL unit header extension. As one example, the MVC NAL unit header extension may include the syntax elements in the following Table 1:

TABLE 1

NAL UNIT HEADER EXENSION SYNTAX

| nal_unit_header_extension( ) { | C | Descriptor |
|---|---|---|
| reserved_zero_bit | All | u(1) |
| idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } | | |

In Table 1 above, the idr_flag element may indicate whether the NAL unit belongs to an instant decode refresh (IDR) or a view-IDR (V-IDR) picture that can be used as a closed-GOP random access point. For example, an IDR picture and all of the pictures succeeding the IDR picture in both a display order and bitstream order can be properly decoded without decoding previous pictures in either bitstream order or display order. The priority_id element may be used with a bitstream adaptation process that varies the bitstream according to changing network conditions and/or capabilities of video decoder 30 and/or display device 32 (e.g., such as single-pass adaptation process). The view_id element may be used to indicate the view identifier for the view to which the NAL unit belongs, which may be used inside an MVC decoder, e.g., for inter-view prediction and outside a decoder, e.g., for rendering. In some instances, the view_id may be set equal to a predefined camera id, and may be relatively large. The temporal_id element may be used to indicate the temporal level of the current NAL unit, which may correspond to a particular frame rate.

The anchor_pic_flag element may be used to indicate whether the NAL unit belongs to an anchor picture that can be used as an open-GOP random access point. For example, anchor pictures and all the pictures succeeding the anchor picture in display order may be properly decoded without decoding previous pictures in the decoding order (i.e. bitstream order) and thus may be used as random access points. Anchor pictures and non-anchor pictures may have different view dependencies, both of which may be signaled in an SPS. That is, as described herein a, a view dependency may generally refer to a view from which a view currently being coded depends. In other words, view dependencies may set forth from which views a view currently being coded may be predicted. According to some examples, view dependency may be signaled in the SPS MVC extension. In such examples, all inter-view prediction may be done within the scope specified by the SPS MVC extension. The inter_view_flag element may be used to indicate whether the NAL unit is used for inter-view prediction for NAL units in other views.

To convey the above 4-byte NAL unit header information for the base view of an MVC bitstream, a prefix NAL unit may be defined in MVC. In the context of MVC, the base view access unit may include the VCL NAL units of a current time instance of a particular view, as well as a prefix NAL unit for the base view access unit, which may contain only the NAL unit header. If the prefix NAL unit is not required for decoding (e.g., such as decoding a single view), a decoder may ignore and/or discard the prefix NAL unit.

With respect to an SPS MVC extension, the MVC SPS may indicate views that may be used for purposes of inter-view prediction. For example, potential inter-view references may be signaled in and SPS MVC extension, and may be modified by the reference picture list construction process, which enables flexible ordering of the inter prediction or inter-view prediction references. An example MVC SPS is set forth in Table 2 below:

TABLE 2

EXAMPLE MVC SPS

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |
|     non_anchor_ref_l0[ i ][ j ] | 0 | ue(v) |
|   num_non_anchor_refs_l1[ i ] | 0 | ue(v) |
|   for( j = 0; j < num_non_anchor_refs_l1[ i ]; j++ ) | | |
|     non_anchor_ref_l1[ i ][ j ] | 0 | ue(v) |
| } | | |
| num_level_values_signalled_minus1 | 0 | ue(v) |
| for( i = 0; | | |
| i <= num_level_values_signalled_minus1; i++ ) { | | |
|   level_idc[ i ] | 0 | u(8) |
|   num_applicable_ops_minus1[ i ] | 0 | ue(v) |
|   for( j = 0; | | |
|   j <= num_applicable_ops_minus1[ i ]; j++ ) { | | |
|     applicable_op_temporal_id[ i ][ j ] | 0 | u(3) |
|     applicable_op_num_target_views_minus1[ i ] [ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
|   } | | |
| } | | |
| } | | |

According to some examples, view dependency may be signaled in the SPS MVC extension. All inter-view prediction may be done within the scope specified by the SPS MVC extension. That is, the SPS may set forth which views may be referred to for purposes of prediction by a view currently being coded. In Table 2 above, the num_anchor_refs_l0[i] element may specify the number of view components for inter-view prediction in the initialized reference picture list for List 0 (e.g., RefPicList0). In addition, the anchor_ref_l0[i][j] element may specify the view_id of the j-th view component for inter-view prediction in the initialized RefPicList0. The num_anchor_refs_l1[i] element may specify the number of view components for inter-view prediction in the initialized reference picture list for list one (e.g., RefPicList1). The anchor_ref_l1[i][j] element may specify the view_id of the j-th view component for inter-view prediction in the initialized RefPicList1. The num_non_anchor_refs_l0[i] element may specify the number of view components for inter-view prediction in the initialized RefPicList0. The non_anchor_ref_l0[i][j] element may specify the view_id of the j-th view component for inter-view prediction in the initialized RefPicList0. The num_non_anchor_refs_l1[i] element may specify the number of view components for inter-view prediction in the initialized RefPicList1. The non_anchor_ref_l1[i][j] element may specify the view_id of the j-th view component for inter-view prediction in the initialized RefPicList.

The initialized, or "initial", reference picture list may be the same or different from a final reference picture list used for purposes of inter-view predicting view components. That is, certain reference candidates (i.e., reference pictures that may be used for inter-view prediction) may be removed from an initial reference picture list (e.g., redundant pictures). In addition, as described in greater detail below, reference candidates may be reordered from the initial reference picture list to form the final reference picture list.

In this example, according to MVC, view dependencies for anchor pictures and non-anchor pictures are separately maintained and signaled. That is, a video coder may determine a total of four reference picture lists (e.g., List 0, non-anchor pictures; List 1, non-anchor pictures; List 0, anchor pictures; List 1, anchor pictures). In addition, as shown in Table 2 above, separate signaling is required to indicate a view dependency to video decoder 30. That is, the SPS must include separate List 0 and List 1 signaling for both anchor_refs and non_anchor_refs.

Moreover, according to Table 2, the inter-view dependency for non-anchor view components is a subset of that for anchor view components. That is, for example, a view component of an anchor view may be predicted from more than one other view, such as view 3 and 4. A non-anchor view, however, may only be predicted from pictures of view 3 (a subset of the anchor view). In this way, the view dependencies for anchor and non-anchor view components may be separately maintained.

In addition, in Table 2, the num_level_values_signalled may specify the number of level values signaled for the coded video sequence. The level_idc[i] element may specify the i-th level value signaled for the coded video sequence. The num_applicable_ops_minus1[i] plus 1 element may specify the number of operation points to which the level indicated by level_idc1[i] applies. The applicable_op_temporal_id[i][j] element may specify the temporal_id of the j-th operation point to which the the level indicated by level_idc[i] applies. The applicable_op_num_target_views_minus1[i][j] element may specify the number of target output views for the j-th operation point to which the level indicated by level_idc[i] applies. The applicable_op_target_view_id[i][j][k] element may specify the k-th target output view for the j-th operation point to which the level indicated by level_idc[i] applies. The applicable_op_num_views_minus1[i][j] element may specify the number of views, including the views that are dependent on by the target output views but that do not belong to the target output views, in the j-th operation point to which the level indicated by level_idc [i] applies.

Accordingly, in the SPS MVC extension, for each view, the number of views that may be used to form reference picture List 0 and reference picture List 1 may be signaled. In addition, the prediction relationship for an anchor picture, as signaled in the SPS MVC extension, may be different from the prediction relationship for the non-anchor picture (signaled in the SPS MVC extension) of the same view.

In MVC, at any given moment during the decoding process, there may be zero or one active PPS, and zero or more active view PPSs, where each active view PPS is active specifically for a particular view order index value that is less than the maximum view order index value. Similarly, at any given moment during the decoding process, there may be zero or one active MVC SPS, and zero or more active view MVC SPSs, where each active view MVC SPS set is active specifically for a particular view order index value that is less than the maximum view order index value.

As described in greater detail below, video encoder 20 and video decoder 30 may flexibly arrange temporal and view prediction references when constructing reference picture lists. Allowing flexible arrangement provides not only potential coding efficiency gain, but also error resilience, because reference picture section and redundant picture mechanisms may be extended to the view dimension. Video encoder 20 and/or video decoder 30 may, in an example, construct a reference picture list according to the following steps:

1) Initialize the reference picture list for temporal (i.e., intra-view) reference pictures, such that reference pictures from other views are not considered.
2) Append the inter-view reference pictures to the end of the list in the order in which the pictures occur in the MVC SPS extension.
3) Apply a reference picture list reordering (RPLR) process for both intra-view and inter-view reference pictures. Inter-view reference pictures may be identified in the RPLR commands by their index values as specified in the MVC SPS extension.

Video encoder 20 and/or video decoder 30 may remove a view component from a decoded picture buffer (may also be referred to as a "reference picture memory," as described in greater detail with respect to FIG. 2 and FIG. 3 below), if the view component is not further used as an inter-view reference when decoding a view component in the same access unit as the view component to be removed and the view component to be removed is not used for output.

In some examples, video encoder 20 and/or video decoder 30 may perform enhanced resolution coding. For example, video encoder 20 and/or video decoder 30 may perform MFC coding according to the techniques of this disclosure, as described in greater detail below.

As noted above, a potential MFC architecture was described in the M26661 proposal. In the proposed architecture, an MFC bitstream contains two views that are coded in a way similar to MVC. For example, a base view includes a packed frame that is arranged as side-by-side or top-bottom (as described in greater detail, for example, with respect to FIG. 5 below) and is compatible to H.264/AVC.

In addition, the MFC bitstream includes at least one enhancement view that is another packed frame, which is arranged as top-bottom (if the base view is side-by-side) or side-by-side (if the base view is top-bottom). The enhancement view may be combined with the base view to provide enhanced resolution. That is, for each time instance, both the view component of the base view and the view component of the enhancement view have to be present to produce the two full resolution views. The enhancement view is not intended for output, since each view component of the enhancement view is only a carrier picture and does not provide an acceptable viewing experience.

In MFC coding, decoded base view pictures are not directly used to inter-view predict the enhancement view pictures. Rather, as described in greater detail below, video encoder 20 and/or video decoder 30 may apply a filter to the base view pictures to generate one or more filtered pictures. The filtered pictures may then be used for purposes of inter-view prediction when coding the enhancement view.

While the proposed MFC architecture generally enables enhanced resolution coding, it lacks efficient support for reference picture management. Moreover, as discussed in greater detail below, the proposed architecture lacks details with respect to a number of syntax elements associated with the MVC framework, upon which the architecture is built.

For example, the decoding process is incompletely specified. With respect to reference picture management, in one access unit, the decoded view component of the base view and the filtered version of the decoded base view component are both present in the decoded picture buffer. However, it is not clearly specified which view component is to be used for inter-view reference following the MVC reference picture management processes, including a reference picture list construction process and reference picture selection process.

In addition, as another example, the reconstructed pictures of the full resolution views (e.g., base view plus enhancement view) may need to be stored in the decoded picture buffer for output. However, the full resolution views are never used for temporal reference. Rather, as noted above, the filtered view components are used for reference. Despite the full resolution views not being used for reference, this characteristic of the full resolution views is not utilized in a decoded picture buffer management process. Accordingly, the full resolution views may be retained for reference in the decoded picture buffer for longer than required (e.g., after output), which may needlessly increase the storage requirements of the decoded picture buffer.

In addition, as another example, as noted above, a combination of the decoded base view and enhancement view are used for output. However, neither the base view nor the enhancement view is supposed for direct display. Accordingly, complicated processing may be required generate the images to be displayed.

As another example, as an extension to MVC, the proposed MFC architecture (as described in the above-identified M26661 proposal) does not fully utilize MVC syntax and decoding processes. Accordingly, the proposed MFC architecture does not enable the directive of the call for proposal, in that the proposed MFC architecture would require more than minimal changes to existing MVC decoders. For example, it is unclear what values a filtered view component or a full resolution reconstructed view component would take for syntax elements and variables such as inter_view_flag, nal_ref_idc, OutputFlag, view order index, and the like.

This disclosure provides various techniques that may address the shortcomings of the proposed MFC architecture described above. For example, aspects of this disclosure relate to MPEG Frame-Compatible (MFC) stereoscopic 3D video coding enhancement technology. Certain aspects of this disclosure include techniques for reference picture list construction and decoded picture management for enhanced resolution coding, such as MFC coding. The techniques of this disclosure may also provide a more complete framework for enabling MFC to use the existing MVC framework with few or no changes to the MVC specification.

In an example, according to aspects of this disclosure, video encoder 20 and/or video decoder 30 may derive and generate view identifiers (e.g., view_ids) for two full resolution views in an MFC framework (e.g., the output views generated using the base view and enhancement view). The view identifiers are generated such that they are not equal to view identifiers of the decoded views, such as a view identifier of a base view and a view identifier of an enhancement view.

In addition, for any view component belonging to the two full resolution views, video encoder 20 and/or video decoder 30 may set the inter_view_flag to zero and a nal_ref_idc syntax element to zero. With these syntax elements set to zero, video encoder 20 and/or video decoder do not use the two full resolution views for reference when coding other view components, such as view components of the base view or enhancement view. Video encoder 20 and/or video decoder 30 may also mark view components of the two full resolution views as "unused for reference" in a decoded picture buffer. In some examples, each view component of the base view has an inter_view_flag syntax element set equal to one.

In some examples, according to aspects of this disclosure, video encoder 20 and/or video decoder 30 may also set a variable OutputFlag to one for any view component that belongs to the two full resolution views. However, video encoder 20 and/or video decoder 30 may also set the OutputFlag syntax element to zero for any view component that does not belong to a full resolution view and therefore does not belong to a target output view.

In this way, video encoder 20 and/or video decoder 30 may leverage syntax elements of MVC in MFC coding. That is, the techniques allow one or more syntax elements of MVC to control the manner in which full resolution views of MFC coding are identified and used.

Video encoder 20 and/or video decoder 30 may also implement techniques of this disclosure to manage pictures stored to a decoded picture buffer. For example, video encoder 20 and/or video decoder 30 may use techniques of this disclosure to distinguish between a decoded view component of a base view and a filtered version of the decoded view component of the base view for each access unit. In some examples, video encoder 20 and/or video decoder 30 may assign to the picture filtered from the decoded view component of the base view a different view identifier and a different view order index than the decoded view component before it has been filtered.

Additionally or alternatively, according to aspects of this disclosure, video encoder 20 and/or video decoder 30 may set an inter_view_flag syntax element of a decoded view component of the base view to zero immediately after decoding the view component of the base view, and may set the inter_view_flag syntax element of the filtered view component (e.g., the filtered version of the view component from the base view) to one. Accordingly, video encoder 20 and/or video decoder 30 may use the filtered view component as a reference when coding view components of other views, such as a view component of an enhancement view.

Additionally or alternatively, when a nal_ref_idc syntax element is greater than zero for a video component of the base view, video encoder 20 and/or video decoder 30 may temporarily mark the decoded view component of the base view as "unused for reference" after generating the filtered view component from the decoded view component of the base view. After decoding the entire access unit containing the view component of the base view, video encoder 20 and/or video decoder 30 may change the designation of the decoded view component of the base view and mark the decoded view component of the base view as "used for short-term reference" or "used for long-term reference" by the reference picture marking process as specified in Annex H of H.264/AVC. Accordingly, the view component of the base view is not used as a reference picture for predictive coding for other pictures in the access unit (such as a view component from an enhancement view, which may rely on a filtered picture for purposes of predictive coding), but may be used by other view components of the base view (of other access units).

Additionally or alternatively, video encoder 20 and/or video decoder 30 may mark a filtered view component from a view component of a base view with one or more syntax elements to indicate that the view component is a filtered view component. For example, video encoder 20 and/or video decoder 30 may mark each filtered view component with a specific flag (e.g., set equal to one), and video encoder 20 and/or video decoder 30 may use a picture for inter-view prediction of a non-base view only when the flag is equal to one for a view component for a given view_id. In this example, video encoder 20 and/or video decoder 30 sets the flag for the view components of the base view to zero, so that the view components of the base view are not used for inter-view reference.

According to some aspects of this disclosure, video encoder 20 may indicate, in an SPS or other parameter set, that multiple views may be signaled based on the decoding and reconstruction order. For example, one or more views may not be present in a bitstream, and a flag may be used to indicate that a view is not present in the bitstream. When a view is not present in the bitstream, video encoder 20 and/or video decoder 30 may reconstruct the view. In addition, according to aspects of this disclosure, full resolution views may be assigned view order index values larger than the other views in a particular access unit, while a filtered view may have a view order index value that is between of the view order index value of the base view and the view order index value of the enhancement view in the bitstream.

In this way, video encoder 20 and/or video decoder 30 may use the syntax and marking techniques described herein to distinguish between different pictures included in a decoded picture buffer (e.g., including, for example, a base view picture, at least one filtered picture, an enhancement picture, a first full resolution picture (a full resolution left-eye picture) and a second full resolution picture (a full resolution right-eye picture). In addition, video encoder 20 and/or video decoder 30 may perform decoded picture buffer management using the syntax and marking techniques described herein. For example, video encoder 20 and/or video decoder may efficiently manage a decoded picture buffer, including removing reference pictures when they are no longer needed and/or not used for reference.

While certain techniques of this disclosure are described with respect to MVC and H.264/AVC (and view components of views), it should be understood that the techniques may also be applicable to other video coding standards, such as the HEVC standard or an HEVC extension such as MV-HEVC, 3D-HEVC, and/or HSVC. That is, the reference picture list construction, reference picture marking and hypothetical reference decoder (HRD) techniques may be applicable to any scalable, multiview or 3D video codecs.

In one example, to support HEVC extensions, video encoder 20 and/or video decoder may mark reference pictures as short-term pictures or long-term pictures, as is performed in the HEVC standard. For example, HEVC distinguishes long-term from short-term reference pictures. In some instances, long-term pictures may be retained in a decoded picture buffer relatively longer than short-term reference pictures. Additionally, syntax elements may be used to indicate whether a reference picture is a long-term or a short-term reference picture.

In extensions to HEVC (such as MV/3D-HEVC and/or HSVC) the long-term and short-term markings may instead be used to differentiate temporal reference pictures (i.e., of the same layer or view as a current picture being coded) from inter-layer or inter-view reference pictures (i.e., of a different layer or view as the current picture being coded). In one example, short-term reference pictures may correspond to temporal reference pictures, while long-term reference pictures may instead correspond to inter-view reference pictures. Thus, the use of long-term and short-term reference pictures may also provide an indication of whether a reference picture is a temporal reference picture or an inter-view or inter-layer reference picture. Likewise, a motion vector referring to a short-term reference picture may comprise a temporal motion vector, whereas a motion vector referring to a long-term reference picture may comprise a disparity motion vector. In other examples, short-term reference pictures may correspond to inter-view or inter-layer reference pictures, while long-term reference pictures may correspond to temporal reference pictures.

According to aspects of this disclosure, video encoder 20 and/or video decoder 30 may mark a base layer/reference view picture as either a short-term or a long-term reference picture and its marking status does not need to be changed. A picture that has been filtered from the base layer/reference view picture, however, may be marked as a long-term reference picture in a way similar to an inter-view reference picture in MV-HEVC. Video encoder 20 and/or video decoder 30 may use the long-term marking to identify the filtered view component when performing inter-view prediction.

In some examples, according to aspects of this disclosure, when video encoder 20 and/or video decoder 30 generates multiple filtered pictures from one base layer/reference view picture (or from multiple base layers/reference view pictures), video encoder 20 and/or video decoder 30 may mark the filtered pictures based on a layer dependency signaled in the video parameter set. For example, for each dependent layer (i), video encoder 20 and/or video decoder 30 may assign each of the filtered representations to a different inter-layer/view reference index. The inter-layer/view reference index, together with the picture order count (POC) value of the representation may be used to identify a filtered inter-layer/view reference picture in the decoded picture buffer. In this way, video encoder 20 and/or video decoder 30 may assign a unique reference index to each filtered view component, which may enable video encoder 20 and/or video decoder 30 to identify the filtered view component when performing predictive coding.

In another example for purposes of illustration, assume that NumRepFromOneBase[i] is a variable indicating a number of representations that are generated (e.g., filtered) from a layer or view with a layer_id equal to LayerIdInterView[i]. Video encoder 20 and/or video decoder 30 may add each of these NumRepFromOneBase[i] representations from each layer/view added into an inter-layer/view reference picture set. As described in greater detail below, video encoder 20 and/or video decoder 30 may set syntax elements in NAL unit header and slice headers of the filtered pictures to the same as those of the base layer/reference view picture. Accordingly, if a layer_id of a filtered picture is not explicitly otherwise set, the layer identifier is the same as that of the reference view/base layer.

In the example described above, video encoder 20 and/or video decoder 30 may identify each filtered picture by both a layer_id and an index among the NumRepFromOneBase[i] representations. That is, as noted above, video encoder 20 and/or video decoder 30 may assign a layer_id to each of the filtered representations that is the same as the layer_id of the layer from which the filtered representations are generated (unless a different layer_id is explicitly assigned to the filtered representations). In addition, video encoder 20 and/ or video decoder 30 may incrementally assign a filtered layer component index to each of the filtered components based on a filtered layer component variable (e.g., NumRepFromOneBase[i], indicating the number of filtered representations).

In an example for purposes of illustration, assume video encoder 20 and/or video decoder 30 generates three filtered representations from a base layer having a particular layer_id. In this example, video encoder 20 and/or video decoder 30 may assign the layer_id to each of the filtered representations. In addition, video encoder 20 and/or video decoder 30 may incrementally assign a filtered layer component index to each of the filtered representations, such that the first representation has an index of 0, the second representation has an index of 1, and the third representation has an index of 2.

In some examples, NumRepFromOneBase[i] may be signaled in a video parameter set (VPS), sequence parameter set (SPS), or slice header. Accordingly, for each reference layer i, video encoder 20 and/or video decoder 30 may reconstruct NumRepFromOneBase[i] filtered layers/views and identify the filtered layers/views by the index to the filtered layers/views.

According to aspects of this disclosure, when coding multiple enhancement layers/views, video encoder 20 and/or video decoder 30 may generate a single filtered picture. That is, video encoder 20 and/or video decoder 30 may use the same filtered picture as a reference for coding multiple enhancement pictures without the need to regenerate the filtered picture (or generate another filtered picture) for coding each enhancement picture of an access unit.

In some examples, the filtered layers/views may be only required for decoding a current view component/layer representation and any other view components/layer representations in decoding order. Accordingly, video encoder 20 and/or video decoder 30 may mark pictures in the inter-view/layer reference picture set (which includes the filtered representations) of the previous view component in decoding order as "unused for reference" before a new inter-view/layer reference picture set is generated. In this way, video encoder 20 and/or video decoder 30 may avoid using a filtered representation of one access unit from being used as a reference picture for another access unit.

Figure 2:
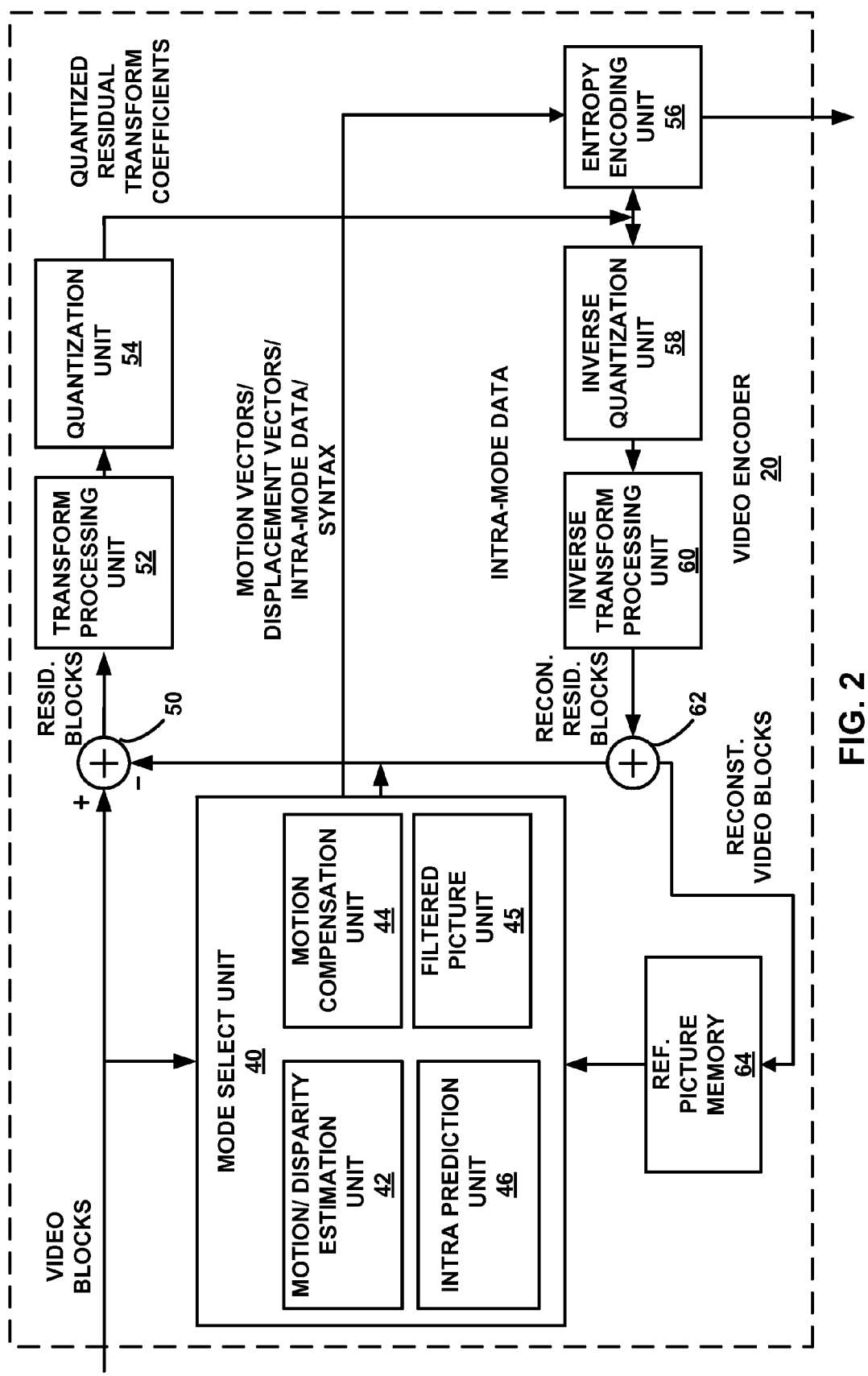
FIG. 2 is a block diagram illustrating an example video encoder that may implement the techniques described in this disclosure.

FIG. 2 is a block diagram illustrating an example video encoder 20 that may implement the techniques described in this disclosure for enhanced resolution coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview and/or scalable video coding. For example, video encoder 20 may be configured to encode multiple, scalable layers of video data in accordance with MVC, MV-HEC, 3D-HEVC, and/or HSVC video coding standard, and may adapt such standards to perform enhanced resolution coding, such as MFC coding. Thus, while reference is made to specific coding standards, it should be understood that the techniques are not specific to any one coding standard, and may be implemented with future and/or not yet developed standards.

In the example of FIG. 2, video encoder 20 includes a mode select unit 40, summer 50, transform processing unit 52, quantization unit 54, entropy encoding unit 56, and reference picture memory 64. Mode select unit 40, in turn, includes motion/disparity estimation unit 42, motion compensation unit 44, filtered prediction unit 45, and intra prediction unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

Mode select unit 40 may receive raw video data in the form of blocks from one or more views. Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion/disparity estimation unit 42 and motion compensation unit 44 may be highly integrated, but are illustrated separately for conceptual purposes. Motion estimation, performed by motion/disparity estimation unit 42, is the process of generating motion vectors, which estimate motion for video blocks. A motion vector, for example, may indicate the displacement of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a reference picture buffer. For example, video encoder 20 may interpolate values of one-quarter pixel positions, one-eighth pixel positions, or other fractional pixel positions of the reference picture. Therefore, motion/disparity estimation unit 42 may perform a motion search relative to the full pixel positions and fractional pixel positions and output a motion vector with fractional pixel precision.

Motion/disparity estimation unit 42 calculates a motion vectors for a video block in an inter-coded slice by comparing the position of the block to the position of a predictive block of a reference picture. Motion estimation/disparity unit 42 may also be configured to perform inter-view prediction, in which case motion estimation/disparity unit 42 may calculate displacement vectors between blocks of one view picture (e.g., view 0) and corresponding blocks of a reference view picture (e.g., view 1).

In general, data for a motion/disparity vector may include a reference picture list, an index into the reference picture list (ref_idx), a horizontal component, and a vertical component. The reference picture may be selected from a first reference picture list (List 0), a second reference picture list (List 1), or a combined reference picture list (List C), each of which identify one or more reference pictures stored in reference picture memory 64. With, respect to the combined list, video encoder 20 alternately select entries from two lists (i.e., List 0 and List 1) to be inserted (appended) into the combined list. When an entry is already put in the combined list, by checking the POC number, video encoder 20 may not insert the entry again. For each list (i.e., List 0 or List 1), video encoder 20 may select the entries based on ascending order of the reference index.

Motion/disparity estimation unit 42 may generate and send a motion/disparity vector that identifies the predictive block of the reference picture to entropy encoding unit 56 and motion compensation unit 44. That is, motion/disparity estimation unit 42 may generate and send motion vector data that identifies the reference picture list containing the predictive block, an index into the reference picture list identifying the picture of the predictive block, and a horizontal and vertical component to locate the predictive block within the identified picture.

Motion compensation, performed by motion compensation unit 44, may involve fetching or generating the predictive block based on the motion/disparity vector determined by motion/disparity estimation unit 42. Again, motion/disparity estimation unit 42 and motion compensation unit 44 may be functionally integrated, in some examples. Upon receiving the motion vector for the current video block, motion compensation unit 44 may locate the predictive block to which the motion vector points in one of the reference picture lists.

Filtered picture unit 45 may generate one or more filtered representations of pictures. For example, as described in greater detail below with respect to FIG. 6 below, MFC coding may include generating packed pictures (e.g., each picture having both a right-eye view and a left-eye view, as described, for example, with respect to FIG. 5 below) in a base view, as well as enhancement pictures in an enhancement view. The base view pictures may be combined with the enhancement view pictures may be combined to provide full resolution right-eye pictures and full resolution left-eye pictures. To improve inter-view coding efficiency (between the base view and the enhancement view) filtered picture unit 45 may generate one or more filtered representations of the base view pictures that more closely match the pictures of the enhancement view. Accordingly, these filtered pictures from filtered picture unit 45 may be added to the reference picture memory 64 and used as a reference by motion/disparity estimation unit 42 and/or motion compensation unit 44.

Summer 50 forms a residual video block by subtracting pixel values of the predictive block from the pixel values of the current video block being coded, forming pixel difference values, as discussed below. In general, motion/disparity estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion/disparity estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context-adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion/disparity estimation unit 42 and motion compensation unit 44 as a reference block to inter-code a block in a subsequent picture.

As noted above, in some examples, video encoder 20 may perform MFC coding using a filtered version of base view (packed) pictures for reference. In such examples, reference picture memory 64 may store five different types of pictures, including, for example, base view (packed) pictures, enhancement view (packed) pictures, one or more filtered pictures, full resolution right-eye pictures, and full resolution left-eye pictures. As described herein, the syntax and marking techniques of this disclosure may be used by video encoder 20 to properly manage the pictures stored to reference picture memory 64.

Video encoder 20 may generate a number of syntax elements, as described above, which may be encoded by entropy encoding unit 56 or another encoding unit of video encoder 20. In some examples, video encoder 20 may generate and encode syntax elements for an MFC bitstream. That is, video encoder 20 may generate and encode syntax elements for enhanced resolution video coding using another base standard, such as MVC, MV-HEVC, 3D-HEVC, SHVC, or the like.

In an example, according to aspects of this disclosure, mode select unit 40 (or another component of video encoder 20) may determine view identifiers (e.g., view_ids) for two full resolution views in an MFC framework (e.g., the output views generated using the base view and enhancement view), such that the view identifiers are not equal to view identifiers of decoded views (e.g., a view identifier of a base view or a view identifier of an enhancement view).

In addition, for any view component belonging to the two full resolution views, mode select unit 40 may set the inter_view_flag to zero and a nal_ref_idc syntax element to zero. With these syntax elements set to zero, video encoder 20 does not use the two full resolution views for reference when coding other view components, such as view components of the base view or enhancement view. Mode select unit 40 may also mark view components of the two full resolution views as "unused for reference" in reference picture memory 64. In some examples, each view component of the base view has an inter_view_flag syntax element set equal to one.

In some examples, according to aspects of this disclosure, mode select unit 40 may also set a variable OutputFlag to one for any view component that belongs to the two full resolution views. However, mode select unit 40 may also set the OutputFlag syntax element to zero for any view component that does not belong to a full resolution view and therefore does not belong to a target output view.

According to some aspects, mode select unit 40 may assign the picture filtered from the decoded view component of the base view with a different view identifier and a different view order index than the decoded view component before it has been filtered. Additionally or alternatively, according to aspects of this disclosure, mode select unit 40 may set an inter_view_flag syntax element of a decoded view component of the base view to zero immediately after decoding the view component of the base view, and may set the inter_view_flag syntax element of the filtered view component (e.g., the filtered version of the view component from the base view) to one. Accordingly, motion/disparity estimation unit 42 may use the filtered view component as a reference when coding view components of other views, such as a view component of an enhancement view.

Additionally or alternatively, when a nal_ref_idc syntax element is greater than zero for a video component of the base view, mode select unit 40 may temporarily mark the decoded view component of the base view as "unused for reference" in reference picture memory 64 after generating the filtered view component from the decoded view component of the base view. After decoding the entire access unit containing the view component of the base view (e.g., using inverse transform processing unit 60, inverse quantization unit 58, and summer 62), mode select unit 40 may change the designation of the decoded view component of the base view and mark the decoded view component of the base view as "used for short-term reference" or "used for long-term reference" by the reference picture marking process as specified in Annex H of H.264/AVC.

Additionally or alternatively, mode select unit 40 may mark a filtered view component from a view component of a base view with one or more syntax elements to indicate that the view component is a filtered view component. For example, mode select unit 40 may mark each filtered view component with a specific flag (e.g., set equal to one), and motion/disparity estimation unit 42 may use a picture for inter-view prediction of a non-base view only when the flag is equal to one for a view component for a given view_id. In this example, mode select unit 40 sets the flag for the view components of the base view to zero, so that the view components of the base view are not used for inter-view reference.

According to some aspects of this disclosure, entropy encoding unit 56 or another unit of video encoder 20 may indicate, in an SPS or other parameter set, that multiple views may be signaled based on the decoding and reconstruction order. For example, one or more views may not be present in a bitstream, and a flag may be used to indicate that a view is not present in the bitstream. When a view is not present in the bitstream, video encoder 20 may reconstruct the view. In addition, according to aspects of this disclosure, full resolution views may be assigned view order index values larger than the other views in a particular access unit, while a filtered view may have a view order index value that is between the view order index value of the base view and the view order index value of the enhancement view in the bitstream.

While certain techniques of FIG. 2 have been described with respect to syntax elements of MVC, it should be understood that the techniques may also be applicable to other video coding standards, such as the HEVC standard or an HEVC extension such as MV-HEVC, 3D-HEVC, and/or HSVC. That is, the reference picture list construction, reference picture marking and hypothetical reference decoder (HRD) techniques may be applicable to any scalable, multiview or 3D video codecs.

In one example, to support HEVC extensions, mode select unit 40 may mark reference pictures as short-term pictures or long-terra pictures, as is performed in the HEVC standard. For example, according to aspects of this disclosure, mode select unit 40 may mark a base layer/reference view picture as either a short-term or a long-term reference picture. In addition, mode select unit 40 may mark a picture that has been filtered from the base layer/reference view picture as a long-term reference picture. Motion/disparity estimation unit 42 may use the long-term marking to identify the filtered view component when performing inter-view prediction.

In some examples, according to aspects of this disclosure, when video encoder 20 generates multiple filtered pictures from one base layer/reference view picture (or from multiple base layers/reference view pictures), mode select unit 40 may mark the filtered pictures based on a layer dependency signaled in the video parameter set. For example, for each dependent layer i, mode select unit 40 may assign each of the filtered representations to a different inter-layer/view reference index. The inter-layer/view reference index, together with the picture order count (POC) value of the representation may be used to identify a filtered inter-layer/view reference picture in the decoded picture buffer. In this way, mode select unit 40 may assign a unique reference index to each filtered view component, which may enable motion/disparity estimation unit to identify the filtered view component when performing predictive coding.

In another example for purposes of illustration, assume that NumRepFromOneBase[i] is a variable indicating a number of representations that are generated (e.g., filtered) from a layer or view with a layer_id equal to LayerIdInterView[i]. Video encoder 20 may add each of these NumRepFromOneBase[i] representations from each layer/view added into an inter-layer/view reference picture set. Video encoder 20 may set syntax elements in NAL unit header and slice headers of the filtered pictures to the same as those of the base layer/reference view picture. Accordingly, if a layer_id of a filtered picture is not explicitly otherwise set, the layer identifier is the same as that of the reference view/base layer.

In the example described above, video encoder 20 may identify each filtered picture by both a layer_id and an index among the NumRepFromOneBase[i] representations. That is, as noted above, video encoder 20 may assign a layer_id to each of the filtered representations that is the same as the layer_id of the layer from which the filtered representations are generated (unless a different layer_id is explicitly assigned to the filtered representations). In addition, video encoder 20 may incrementally assign a filtered layer component index to each of the filtered components based on a filtered layer component variable (e.g., NumRepFromOneBase[i], indicating the number of filtered representations).

While techniques may be ascribed to certain units of video encoder 20 (such as mode select unit 40, entropy encoding unit 56, or the like), it should be understood that the techniques are not limited to being performed by such units, and that a variety of other units of video encoder 20 may be responsible for carrying out the techniques of this disclosure.

Figure 3:
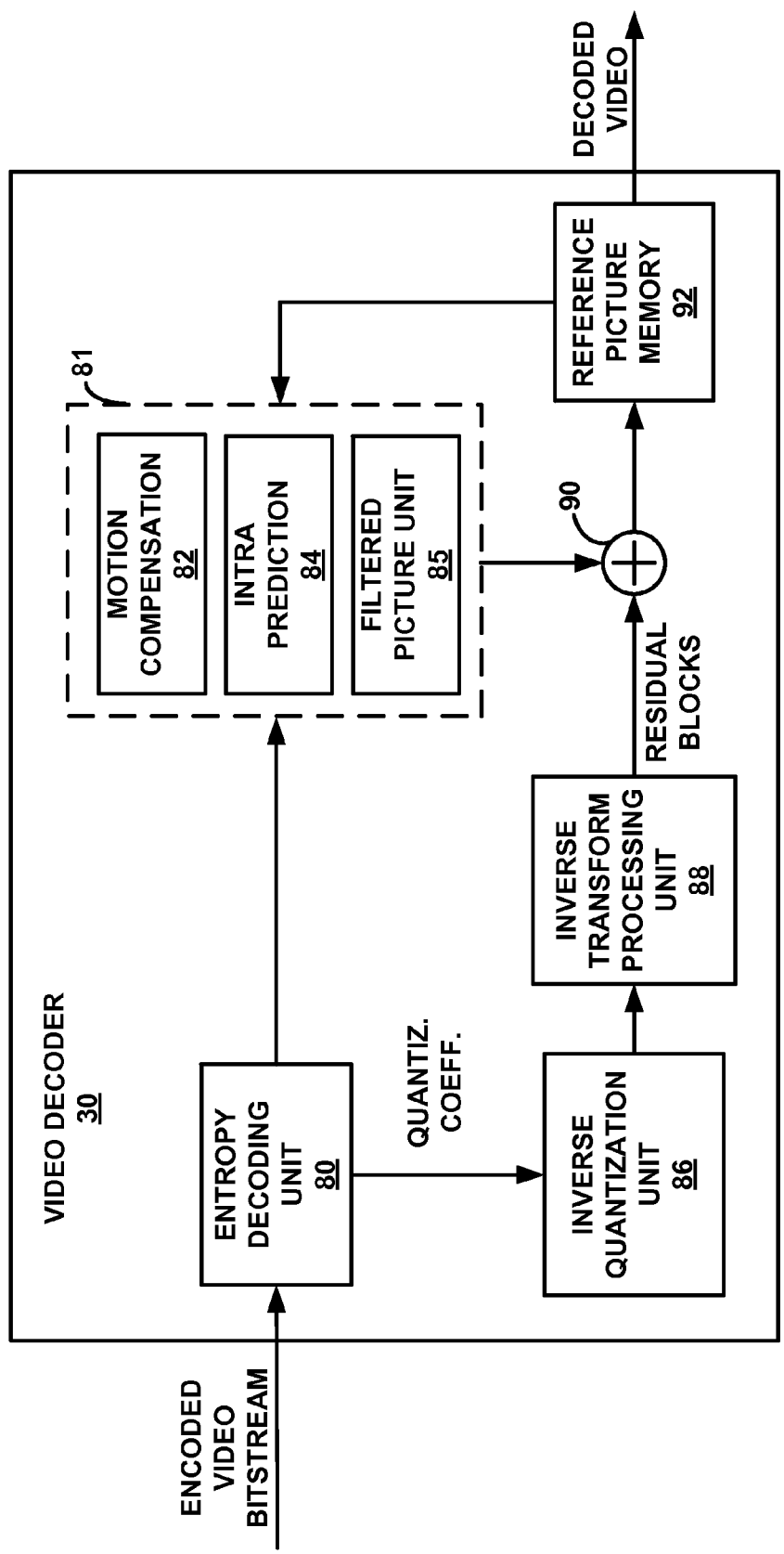
FIG. 3 is a block diagram illustrating an example video decoder that may implement the techniques described in this disclosure.

FIG. 3 is a block diagram illustrating an example video decoder 30 that may implement the techniques described in this disclosure for enhanced resolution coding. As noted above, video decoder 30 may be adapted to perform multi-view and/or scalable video coding. For example, video decoder 30 may be configured to encode multiple, scalable layers of video data in accordance with MVC, MV-HEVC, 3D-HEVC, and/or HSVC video coding standard, and may adapt such standards to perform enhanced resolution coding, such as MFC coding. Thus, while reference is made to specific coding standards, it should be understood that the techniques are not specific to any one coding standard, and may be implemented with future and/or not yet developed standards.

In the example of FIG. 3, video decoder 30 includes an entropy decoding unit 80, prediction unit 81 having motion compensation unit 82 and intra prediction unit 84, filtered picture unit 85, inverse quantization unit 86, inverse transformation unit 88, summer 90, and reference picture memory 92.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, video decoder 30 may receive a number of NAL units having a NAL unit header that identifies a type of data stored to the NAL unit (e.g., VCL data and non-VCL data). Parameter sets may contain the sequence-level header information, such as an SPS, PPS, or other parameter set described above.

When the video slice is coded as an intra-coded (I) slice, intra prediction unit 84 of prediction unit 81 may generate prediction data for a video block of the current video slice based on a signaled intra prediction mode and data from previously decoded blocks of the current picture.

When the picture is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, List 0 and List 1 (or a combined list, List c) using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Filtered picture unit 85 may generate one or more filtered representations of pictures. For example, as described in greater detail below with respect to FIG. 6 below, MFC coding may include generating packed pictures (e.g., each picture having both a right-eye view and a left-eye view, as described, for example, with respect to FIG. 5 below) in a base view, as well as enhancement pictures in an enhancement view. The base view pictures may be combined with the enhancement view pictures may be combined to provide full resolution right-eye pictures and full resolution left-eye pictures. To improve inter-view coding efficiency (between the base view and the enhancement view) filtered picture unit 85 may generate one or more filtered representations of the base view pictures that more closely match the pictures of the enhancement view. Accordingly, these filtered pictures from filtered picture unit 85 may be added to the reference picture memory 92 and used as a reference by motion compensation unit 82.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. According to the aspects of this disclosure, inverse transform processing unit 88 may determine the manner in which transforms were applied to residual data. That is, for example, inverse transform processing unit 88 may determine an RQT that represents the manner in which transforms (e.g., DCT, integer transform, wavelet transform, or one or more other transforms) were applied to the residual luma samples and the residual chroma samples associated with a block of received video data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

As noted above, in some examples, video decoder 30 may perform MFC coding using a filtered version of base view (packed) pictures for reference. In such examples, reference picture memory 92 may store five different types of pictures, including, for example, base view (packed) pictures, enhancement view (packed) pictures, one or more filtered pictures, full resolution right-eye pictures, and full resolution left-eye pictures. As described herein, the syntax and marking techniques of this disclosure may be used by video decoder 30 to properly manage the pictures stored to reference picture memory 64.

Accordingly, video decoder 30 may be configured to perform techniques similar to, or the same as the techniques described with respect to video encoder 20. For example, video decoder 30 may generate a number of syntax elements, such as syntax elements for an MFC bitstream. That is, decoder 30 may generate syntax elements for enhanced resolution video coding using another base standard, such as MVC, MV-HEVC, 3D-HEVC, SHVC, or the like. In other examples, however, video decoder 30 may parse and decode such syntax elements from an encoded bitstream. That is, rather than imposing internal constraints to set syntax elements to a particular value, video decoder 30 may receive and decode an encoded bitstream that includes encoded syntax elements (as described above with respect to video encoder 20) and may leverage such decoded syntax elements to perform the techniques of this disclosure. Accordingly, while certain techniques of this disclosure may refer to video decoder 30 as setting or assigning a value of a particular syntax element, it should be understood that, in some instances, video decoder 30 may not actually set the value, but rather decode the value from an encoded bitstream.

In any case, according to aspects of this disclosure, prediction unit 81 (or another component of video decoder 30) may determine view identifiers (e.g., view_ids) for two full resolution views in an MFC framework (e.g., the output views generated using the base view and enhancement view), such that the view identifiers are not equal to view identifiers of decoded views (e.g., a view identifier of a base view or a view identifier of an enhancement view). In addition, for any view component belonging to the two full resolution views, prediction unit 81 may set the inter_view_flag to zero and a nal_ref_idc syntax element to zero. With these syntax elements set to zero, video decoder 30 does not use the two full resolution views for reference when coding other view components, such as view components of the base view or enhancement view. Prediction unit 81 may also mark view components of the two full resolution views as "unused for reference" in reference picture memory 92. In some examples, each view-component of the base view has an inter_view_flag syntax element set equal to one.

In some examples, according to aspects of this disclosure, prediction unit 81 may also set a variable OutputFlag to one for any view component that belongs to the two full resolution views. However, prediction unit 81 may also set the OutputFlag syntax element to zero for any view component that does not belong to a full resolution view and therefore does not belong to a target output view.

According to some aspects, filtered picture unit 85 may assign the picture filtered from the decoded view component of the base view with a different view identifier and a different view order index than the decoded view component before it has been filtered. Additionally or alternatively, according to aspects of this disclosure, prediction unit 81 may set an inter_view_flag syntax element of a decoded view component of the base view to zero immediately after decoding the view component of the base view, and may set the inter_view_flag syntax element of the filtered view component (e.g., the filtered version of the view component from the base view) to one. Accordingly, motion compensation unit 82 may use the filtered view component as a reference when coding view components of other views, such as a view component of an enhancement view.

Additionally or alternatively, when a nal_ref_idc syntax element is greater than zero for a video component of the base view, prediction unit 81 may temporarily mark the decoded view component of the base view as "unused for reference" in reference picture memory 92 after generating the filtered view component from the decoded view-component of the base view. After decoding the entire access unit containing the view component of the base view (e.g., motion compensation unit 82, inverse quantization unit 86, and inverse transform processing unit 88, as noted above), video decoder 30 may change the designation of the decoded view component of the base view and mark the decoded view component of the base view as "used for short-term reference" or "used for long-term reference" by the reference picture marking process as specified in Annex H of H.264/AVC.

Additionally or alternatively, prediction unit 81 may mark a filtered view component from a view component of a base view with one or more syntax elements to indicate that the view component is a filtered view component. For example, prediction unit 81 may mark each filtered view component with a specific flag (e.g., set equal to one), and motion compensation unit 82 may use a picture for inter-view prediction of a non-base view only when the flag is equal to one for a view component for a given view_id. In this example, prediction unit 81 sets the flag for the view components of the base view to zero, so that the view components of the base view are not used for inter-view reference.

According to some aspects of this disclosure, entropy decoding unit 80 or another unit of video decoder 30 may parse, from an encoded multiview bitstream, in an SPS or other parameter set, that indicates that multiple views may be signaled based on the decoding and reconstruction order. For example, one or more views may not be present in a bitstream, and a flag may be used to indicate that a view is not present in the bitstream. When a view is not present in the bitstream, video decoder 30 may reconstruct the view. In addition, according to aspects of this disclosure, full resolution views may be assigned view order index values larger than the other views in a particular access unit, while a filtered view may have a view order index value that is between of the view order index value of the base view and the view order index value of the enhancement view in the bitstream.

While certain techniques of FIG. 3 have been described with respect to syntax elements of MVC, it should be understood that the techniques may also be applicable to other video coding standards, such as the HEVC standard or an HEVC extension such as MV-HEVC, 3D-HEVC, and/or HSVC. That is, the reference picture list construction, reference picture marking and hypothetical reference decoder (HRD) techniques may be applicable to any scalable, multiview or 3D video codecs.

In one example, to support HEVC extensions, prediction unit 81 may mark reference pictures as short-term pictures or long-term pictures, as is performed in the HEVC standard. For example, according to aspects of this disclosure, mode select unit 40 may mark a base layer/reference view picture as either a short-term or a long-term reference picture. In addition, prediction unit 81 may mark a picture that has been filtered from the base layer/reference view picture as a long-term reference picture. Motion compensation unit 82 may use the long-term marking to identify the filtered view component when performing inter-view prediction.

In some examples, according to aspects of this disclosure, when video decoder 30 generates multiple filtered pictures from one base layer/reference view picture (or from multiple base layers/reference view pictures), prediction unit 81 may mark the filtered pictures based on a layer dependency signaled in the video parameter set (VPS). For example, for each dependent layer i, prediction unit 81 may assign each of the filtered representations to a different inter-layer/view reference index. The inter-layer/view reference index, together with the picture order count (POC) value of the representation, may be used to identify a filtered inter-layer/view reference picture in the decoded picture buffer. In this way, prediction unit 81 may assign a unique reference index to each filtered view component, which may enable motion/disparity estimation unit to identify the filtered view component when performing predictive coding.

In an example, assume that NumRepFromOneBase[i] is a variable indicating a number of representations that are generated (e.g., filtered) from a layer or view with a layer_id equal to LayerIdInterView[i]. Video decoder 30 may receive the NumRepFromOneBase[i] as a syntax element in the bitstream. Video decoder 30 may add each of these NumRepFromOneBase[i] representations from each layer/view added into an inter-layer/view reference picture set. Video decoder 30 may set syntax elements in NAL unit header and slice headers of the filtered pictures to the same as those of the base layer/reference view picture. Accordingly, if a layer_id of a filtered picture is not explicitly otherwise set, the layer identifier is the same as that of the reference view/base layer.

In the example described above, video decoder 30 may identify each filtered picture by both a layer_id and an index among the NumRepFromOneBase[i] representations. That is, as noted above, video decoder 30 may assign a layer_id to each of the filtered representations that is the same as the layer_id of the layer from which the filtered representations are generated (unless a different layer_id is explicitly assigned to the filtered representations). In addition, video decoder 30 may incrementally assign a filtered layer component index to each of the filtered components based on a filtered layer component variable (e.g., NumRepFromOneBase[i], indicating the number of filtered representations).

While techniques may be ascribed to certain units of video decoder 30 (such as entropy decoding unit 80, prediction unit 81, or the like), it should be understood that the techniques are not limited to being performed by such units, and that a variety of other units of video decoder 30 may be responsible for carrying out the techniques of this disclosure.

Figure 4:
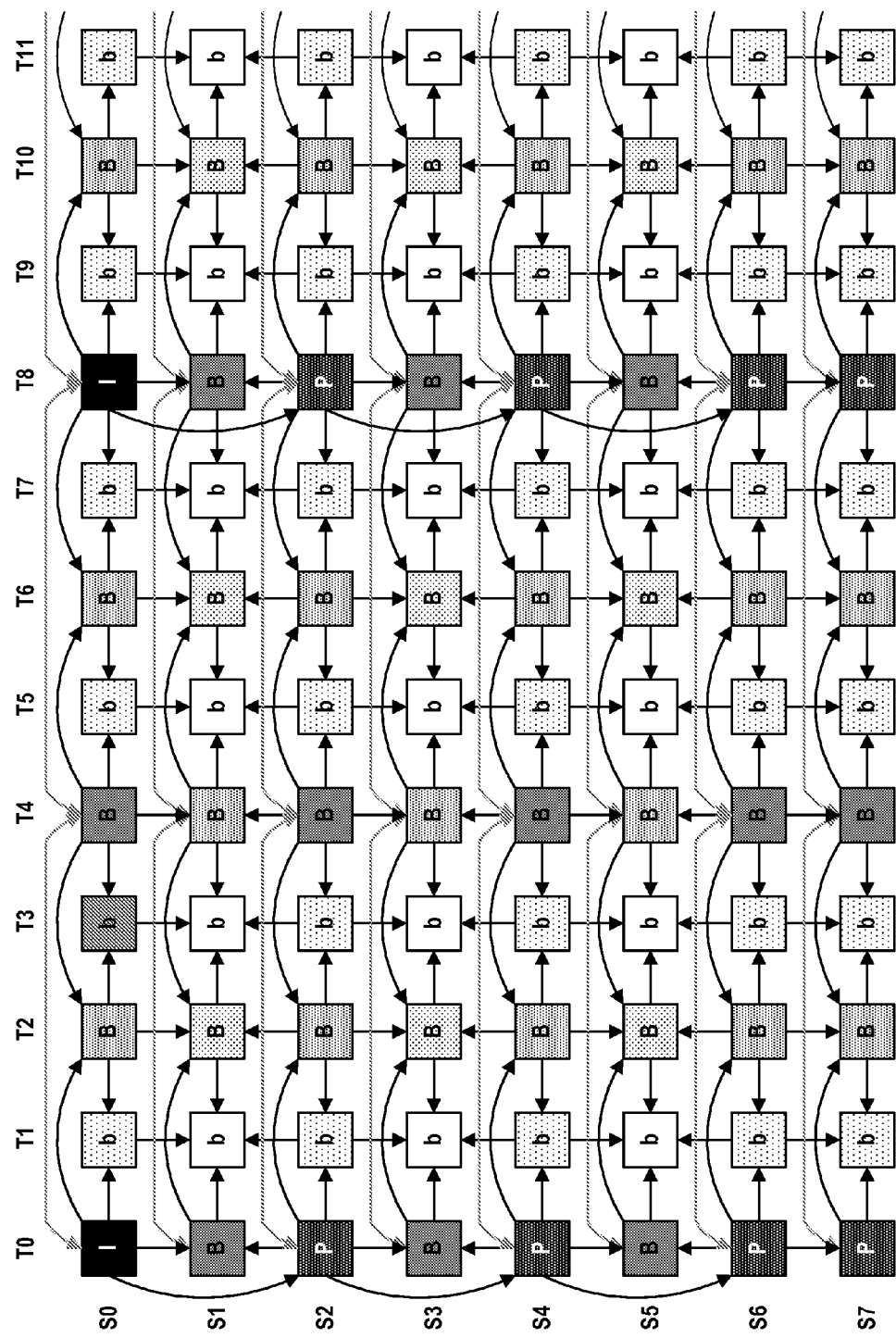
FIG. 4 is a conceptual diagram illustrating an example Multiview Video Coding (MVC) prediction pattern.

FIG. 4 is a conceptual diagram illustrating an example MVC prediction pattern. In the example of FIG. 4, eight views are illustrated, and twelve temporal locations are illustrated for each view. In general, each row in FIG. 4 corresponds to a view, while each column indicates a temporal location. Each of the views may be identified using a view identifier ("view_id"), which may be used to indicate a relative camera location with respect to the other views. In the example shown in FIG. 4, the view IDs are indicated as "S0" through "S7", although numeric view IDs may also be used. In addition, each of the temporal locations may be identified using a picture order count (POC) value, which indicates a display order of the pictures. In the example shown in FIG. 4, the POC values are indicated as "T0" through "T11."

Although MVC has a so-called base view which is decodable by H.264/AVC decoders and stereo view pair can be supported by MVC, MVC may support more than two views as a 3D video input. Accordingly, a renderer of a client having an MVC decoder may expect 3D video content with multiple views.

Pictures in FIG. 4 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view 82 at temporal location T0 is predicted from the I-frame of view S0 at temporal location T0. Each of the pictures shown in FIG. 4 may be referred to as a view component. That is, a view component of a view corresponds to particular temporal instance of the view.

As with single view video encoding, pictures of a multiview video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references may be signaled in the SPS MVC extension and may be modified by the reference picture list construction process, which enables flexible ordering of the inter-prediction or inter-view prediction references.

FIG. 4 provides various examples of inter-view prediction. Pictures of view S1, in the example of FIG. 4, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between pictures, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. According to MVC, for each view order index i, the corresponding view_id is signaled. The decoding of the view components follows the ascending order of the view order indexes. If all the views are presented, then the set of view order indexes comprises a consecutively ordered set from zero to one less than the full number of views.

In some instances, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require a smooth viewing experience and might prefer views with view_id values S0, S1, and S2, while another other client may require view scalability and prefer views with view_id values S0, S2, and S4. Both of these sub-bitstreams can be decoded as independent MVC bitstreams and can be supported simultaneously.

In general, camera position, orientation, and geometrical relation between different views can be inferred from View ID or View Order Index. For this purpose, both intrinsic and extrinsic camera parameters may be included in the bitstream using a Multiview Acquisition Information SEI message.

According to aspects of this disclosure, a video coder (such as video encoder 20 and/or video decoder 30) may leverage the MVC syntax and coding structure shown in FIG. 4 to perform high resolution video coding, e.g., MFC coding. For example, as noted above, the video coder may code a base view having packed view components (e.g., each picture having both a right-eye view and a left-eye view, as described, for example, with respect to FIG. 5 below), as well as an enhancement view having enhancement pictures. The enhancement view may also include packed view components that, when combined with the packed view components of the base view, form full resolution right-eye view pictures and left-eye view pictures.

However, rather than predicting the view components of the enhancement view directly from the view components of the base view, the video coder may generate one or more filtered view components from the base view, and use the filtered view components for inter-view prediction, as noted below with respect to FIG. 6.

Figure 5:
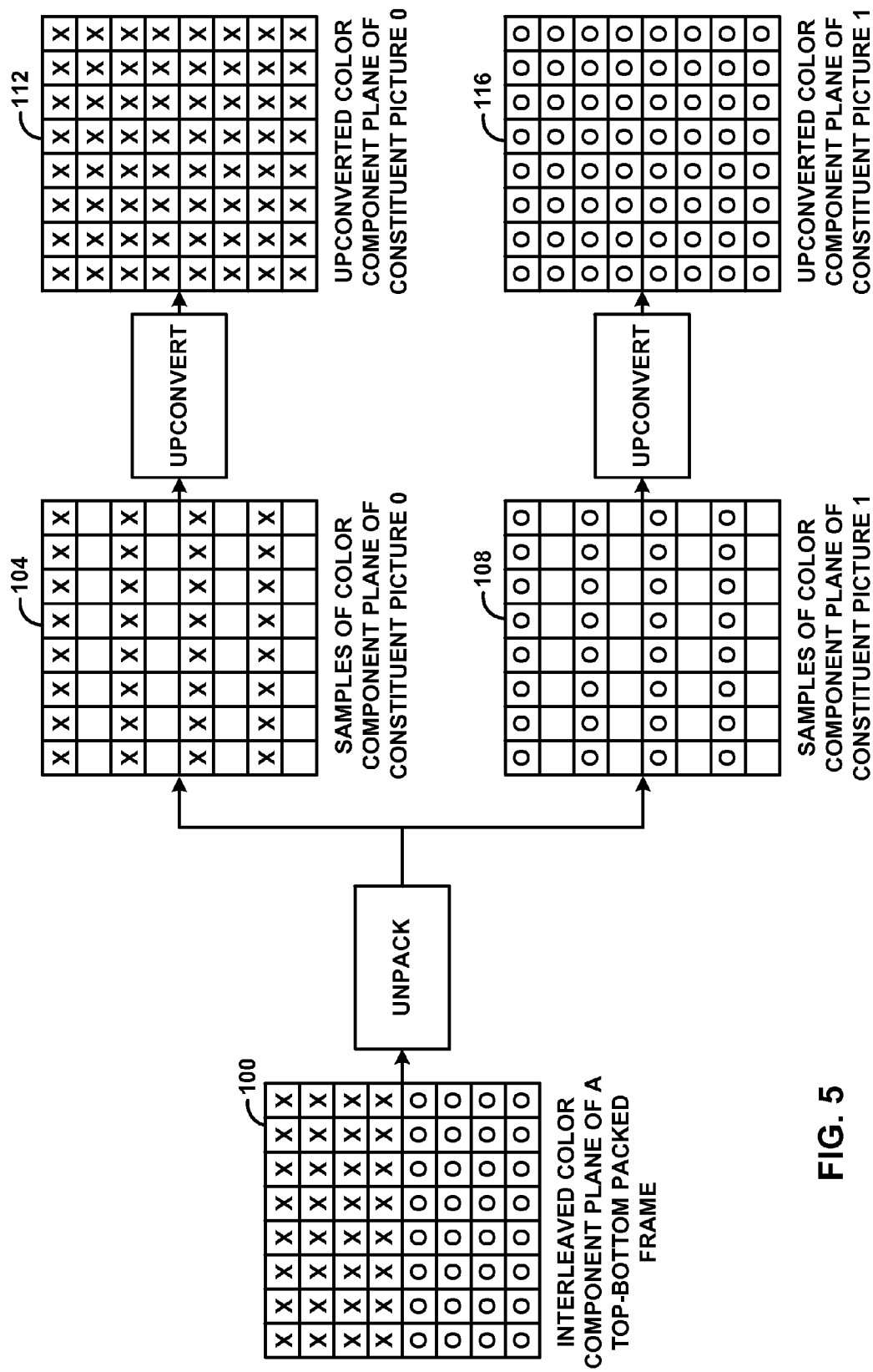
FIG. 5 is a conceptual diagram illustrating decoding a packed base layer.

FIG. 5 is a conceptual diagram illustrating decoding a packed base layer. For example, H.264/AVC supports interleaving of two pictures of left-eye view and right-eye view into one picture and coding such pictures into a video sequence. In the example shown in FIG. 5, a packed picture 100 (which may be included in a base view) may be unpacked to a picture of samples of a first view 104 (view 0) and a picture of samples of a second view 108 (view 1). The picture of samples of the first view 104 may then be upconverted (e.g., upsampled) to generate an upconverted version of the picture of the first view 112. Likewise, the picture of samples of the second view 108 may be upconverted (e.g., upsampled) to generate an upconverted version of the picture of the second view 116.

The example of FIG. 5 illustrates a top-bottom frame packing arrangement of the packed picture 100. However, other frame packing arrangements are also possible. For example, a particular frame packing arrangement may be provided in an SET message. Potential frame packing types indicated by the SEI message may include a checkerboard pattern, a column interleaving pattern, a row interleaving pattern, or a side-by-side pattern.

Accordingly, a base layer may be compliant with H.264/AVC, which allows two pictures to be subsampled and packed into a single frame for coding. In addition, enhancement layers may be coded with respect to the base layer and/or with respect to another enhancement layer. In an example in which an operation point corresponds to only the base layer, and a client device is capable of two-dimensional (2D) display, the client device may decode the base layer and discard the pictures associated with one of the views of the base layer. That is, for example, the client device may display the pictures associated with one view of the base layer (e.g., the left-eye view) and discard the pictures associated with the other view of the base layer (e.g., the right-eye view).

In another example in which an operation point includes the base layer, and a client device is capable of stereo or three-dimensional (3D) display, the client device may decode the base layer and display pictures of both views associated with the base layer. That is, the client device may receive the base layer and reconstruct pictures of the left-eye view and right-eye view for display. In the example shown in FIG. 5, the client device may upsample the pictures of the left-eye view and right-eye view of the base layer before displaying the pictures.

Figure 6:
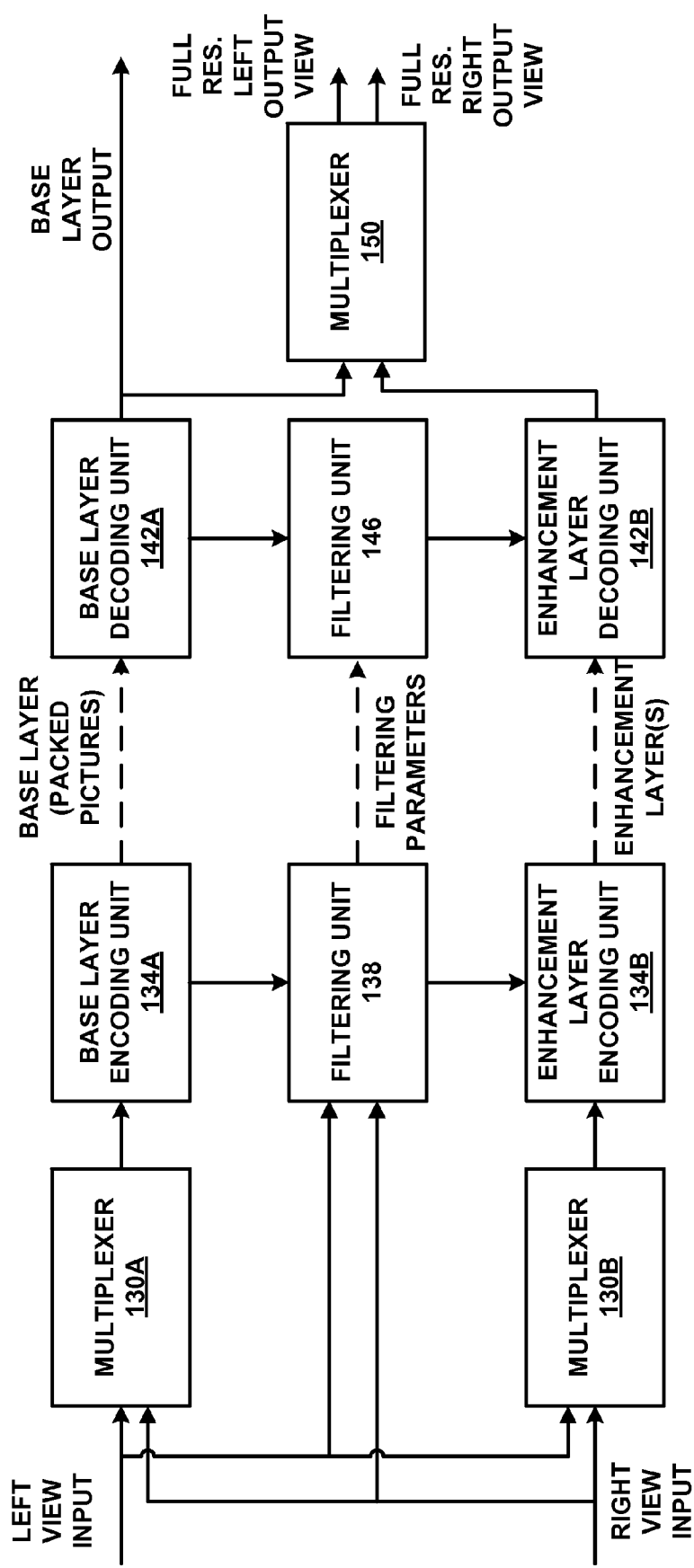
FIG. 6 is a conceptual diagram illustrating an example MPEG Frame Compatible (MFC) coding process.

In MFC coding, to accommodate higher resolution coding, rather than simply upsampling the right-eye view pictures and left-eye view pictures, these pictures may be combined with pictures from an enhancement layer to form full resolution right-eye view pictures and full resolution left-eye view pictures, as described with respect to FIG. 6.

FIG. 6 is a conceptual diagram illustrating an example MPEG Frame Compatible (MFC) coding process. As noted above, the goal of the call for proposals on MFC was to provide efficient compression and reconstruction of full resolution stereo video while maintaining backwards compatibility with AVC Frame Compatible bitstreams.

In the example shown in FIG. 6, frame compatible 3D is achieved by multiplexing two views into a single frame configuration using a frame packing arrangement, such as side-by-side or top-and-bottom. As noted above, frame packing may be achieved by low-pass filtering and sub-sampling, usually by half for each view, while maintaining compatibility with existing codecs and currently deployed infrastructures. A frame-packed base layer may include reduced resolution pictures of the left view and the right view.

In some examples, to return the pictures of the left view and right view to the original resolution, the missing information may be provided using an enhancement layer. For example, the base layer may carry frame-packed pictures that legacy decoders may decode and up-sample. The enhancement layer may carry the orthogonal high frequencies that are lost in the base layer when sub-sampling to generate the packed frames. Thus, the base layer and enhancement layer may use orthogonal frame packing formats. That is, when the base layer is arranged in a side-by-side format and the enhancement layer is arranged in a top-and-bottom format, the video coder may generate full resolution pictures by preserving the vertical high frequencies intact in the base layer and horizontal high frequencies intact in the enhancement layer. Other orthogonal arrangements are also possible.

In this way, the enhancement layer may include packed pictures that, when combined with the base layer, produces full resolution left view pictures and right view pictures. While the enhancement layer may be used to increase resolution, the enhancement layer is not itself viewable. In addition, because the base layer and the enhancement layer have different formats, the MVC architecture may not be able to perform inter-layer prediction between the base layer and enhancement layer. In some examples, as noted above, a filtered version of the base layer pictures may be generated and used for purposes of inter-view prediction.

For example, base layer reference pictures may be pre-processed before being used for the prediction of corresponding enhancement layer pictures. The preprocessing may include downsampling and upsampling filters for a format conversion from the base layer format to the enhancement layer format, as well as for better prediction accuracy for the enhancement layer. For example, vertical downsampling may first be performed on the base layer picture, followed by horizontal upsampling to generate a top-and-bottom prediction picture (in examples in which the enhancement layer pictures are in a top-and-bottom format). To improve the inter-layer prediction accuracy, the prediction picture can be partitioned into multiple regions and each region can be assigned to a different filter.

In operation, as shown in the example of FIG. 6, a left view input and a right view input may be provided to multiplexers 130A and 130B. The multiplexers may combine the left view pictures and the right view pictures to form multiplexed pictures that include both the left view information and right view information.

The multiplexed pictures may be provided to base layer encoding unit 134A, enhancement layer encoding unit 134B, and filtering unit 138. While shown separately for purposes of explanation, it should be understood that base layer encoding unit 134A, enhancement layer encoding unit 134B, and filtering unit 138 may be included in the same encoding unit, such as video encoder 20 (including filtered picture unit 45). Base layer encoding unit 134A may encode packed frames of a base layer. In addition, filtering unit 138 may, as noted above, generated a filtered version of the base layer pictures for purposes of inter-layer prediction. Enhancement layer encoding unit 134B may encode enhancement layer pictures using the filtered pictures as a reference.

The base layer pictures, filtering parameters, and enhancement layer pictures are provided to base layer decoding unit 142A, enhancement layer decoding unit 142B, and filtering unit 146. Again, while shown separately for purposes of explanation, it should be understood that base layer decoding unit 142A, enhancement layer decoding unit 142B, and filtering unit 146 may be included in the same decoding unit, such as video decoder 30 (including filtered picture unit 85). Base layer decoding unit 142A may decode packed frames of the base layer and output the base layer. In addition, filtering unit 146 may, as noted above, generated a filtered version of the base layer pictures for purposes of inter-layer prediction. Accordingly, enhancement layer decoding unit 142B may decode enhancement layer pictures using the filtered pictures as a reference. Enhancement layer decoding unit 142B may provide the enhancement layer pictures to multiplexer 150, which may combine the enhancement layer pictures and base layer pictures to form full resolution left output view pictures and full resolution right output view pictures.

The techniques of this disclosure may be used for reference picture list construction and decoded picture management (or reference picture memory management) in MFC coding, such as the example coding process shown in FIG. 6. The techniques of this disclosure may also provide a more complete framework for enabling MFC to use the existing MVC framework with few or no changes to the MVC specification.

In an example, according to aspects of this disclosure, video encoder 20 and/or video decoder 30 may derive and generate view identifiers (e.g., view_ids) for two full resolution views in an MFC framework (e.g., the output views generated using the base view and enhancement view). The view identifiers are generated such that they are not equal to view identifiers of the decoded views, such as a view identifier of a base view and a view identifier of an enhancement view.

For example, in an example SPS MVC extension, the value of num_views_minus1 may be set to 4, and a video coder (such as video encoder 20 and/or video decoder 30) may use the following mapping between a view order index and a view_id and view.

TABLE 3

EXAMPLE MAPPING

| View order index | view_id | Description of the view |
|---|---|---|
| 0 | a | AVC compatible base view (view a), which is also the first coded view |
| 1 | b | Filtered base view (view b), which directly depends on view a |
| 2 | c | The second coded view (view c), which directly depends on view b |
| 3 | d | The left full resolution view (view d), which directly depends on view c and view a |
| 4 | e | The right full resolution view (view e), which directly depends on view c and view a |

In the example mapping above, a, b, c, d and e may be five different non-negative integer values. In some examples, a, b, e, d and e may be set to 0, 1, 2, 3 and 4. Accordingly, the video coder may assign unique view identifiers and view order index values to each view used in MFC coding.

In addition, according to aspects of this disclosure, an example SPS extension may be formed as shown in Table 4 below:

TABLE 4

EXAMPLE SPS MFC EXTENSION

| seq_parameter_set_mfc_extension( ) { | C | Descriptor |
|---|---|---|
| for ( i = 0 ; i < 2 ; i++ ) | | |
|    real_view_id[ i ] | 0 | ue(v) |
| ... | | |
| } | | |

In the example above, real_view_id[i] specifies the view identifier of the i-th full resolution views. In another example, this information may be present in video usability information (VUI) or an SEI message. In still another example, real_view_id[i] values may be coded using fixed-length codes u(n), with n being, for example, 10 bits. In still another example, the five non-negative integer values of a, b, c, d and e may be signalled in an SPS MFC extension, VUI or an SEI message.

In some examples, video encoder 20 and/or video decoder 30 may leverage syntax elements of MVC in MFC coding. That is, the techniques allow one or more syntax elements of MVC to control the manner in which full resolution views of MFC coding are identified and used.

According to aspects of this disclosure, modifications to the MVC decoding process may be as follows (with departures from the MVC standard indicated):
MFC Decoding Process
A.1 MVC Decoding Process
The specifications in Annex H apply with the following modifications.
The target output views have view order index equal to 3 and 4.
The multiview video decoding process specified in this subclause is repeatedly invoked for each view component with VOIdx from vOIdxMin to VOIdxMax, inclusive, which is present in the list vOIdxList, in increasing order of VOIdx. vOIdxList contains two views with view order index equal to 0 and 2.

After the decoding process for each view component with VOIdx equal to 0 is invoked, sub-clause A.2 is invoked to filer the view decoded view component with view order index equal to 0 and to derive the view component with view order index equal to 1.

After the decoding process for each view component with VOIdx equal to 2 is invoked, sub-clause A.3 is invoked to derive the full resolution view components with view order index equal to 3 and 4.

Outputs of the multiview video decoding process are decoded samples of the current primary coded picture including all decoded view components with view order index equal to 3 and 4.
A.1.1 MFC Decoding Process for Picture Order Count
The specifications in subclause H.8.1 apply.
A.1.2 MFC Decoding Process for Reference Picture Lists Construction
The specifications in subclause H.8.2 apply.
A.1.3 MVC Decoded Reference Picture Marking Process
The specifications in subclause H.8.3 apply.
A.1.4 MVC Inter Prediction and Inter-View Prediction Process
The specifications in subclause H.8.3 apply.
A.1.5 Specification of Bitstream Subsets
The specifications in subclause H.8.5 apply with the following constraints. viewIdTargetList contains either only the base view or both views with view order index equal to 0 and 2.
A.2 Picture Processing
This subclause is technically similar to or the same as subclause H.2.4.1 as specified in the M26661 proposal. In addition, however, and separate from the M26661 proposal, the values of the syntax elements in NAL unit header and slice header of the processed picture may be set to the same as those of the base view picture, unless otherwise set explicitly.
This process is invoked to process inter-view prediction reference in Orthogonal Muxing Frame Compatible Full Resolution (OM-FCFR).
Inputs of this process are:
  a variable interlaceProcessingFlag equal to interlace_processing_flag,
  an inter-view prediction reference picture sample array refPicture for luma or chroma components,
Output of this process is the modified inter-view prediction reference picture sample array rpuPicture.
When interlaceProcessingFlag is equal to 0, subclause A.2.1.1.1 is invoked.
When interlaceProcessingFlag is equal to 1, subclause A.2.1.1.2 is invoked.
A.2.1.1.1 Reference Picture Processing for Progressive Scan
Inputs of this process are:
  two variables refW and refH specifying the width and height, respectively, of the inter-view prediction reference picture sample array,
  a (refW)×(refH) array refPicture of inter-view prediction picture sample values,
  a variable rpuFormat, representing a frame packing arrangement format of the base view with rpuFormat equal to rpu_format,
  a variable filterIdxDown equal to filter_idx_down for luma or chroma components,
  a variable filterDownRange equal to filter_dynamic_range[filterIdxDown] in Table H-1,
  a variable filterDownOffset equal to filter_offset[filterIdxDown] in Table H-1,
  a variable filterDownLength equal to filter_1D_tap_length[filterIdxDown] in Table H-1, a (filterDownLength) array of filter coefficients d[i] equal to filter_1D_tap[filterIdxDown, i] with i=0 . . . (filterDownLength−1), in Table H-1, a variable filterIdxUp equal to filter_idx_up for luma or chroma components, a variable filterUpRange equal to filter_dynamic_range[filterIdxUp] in Table H-2, a variable filterUpOffset equal to filter_offset[filterIdxUp] in Table H-2, a variable filterUpLength equal to filter_1D_tap_length[filterIdxUp] in Table H-2, a (filterUpLength) array of filter coefficients u[i] equal tofilter_1D_tap[filterIdxUp, i] with i=0 . . . (filterUpLength−1), in Table H-2. Output of this process is a (refW)×(refH) array rpuPicture of the modified inter-view prediction picture sample values.

TABLE H-1

RPU downsampling filter parameters

| filter_idx_down | filter_1D_tap | Filter_dynamic_range | filter_offset | filter_1D_tap_length |
|---|---|---|---|---|
| 0 | [4 7 10 7 4] | 6 | 32 | 5 |
| 1 | [2 8 17 24 26 24 17 8 2] | 8 | 128 | 9 |

TABLE H-2

RPU upsampling filter parameters

| filter_idx_up | filter_1D_tap | Filter_dynamic_range | filter_offset | filter_1D_tap_length |
|---|---|---|---|---|
| 0 | [3 −17 78 78 −17 3] | 7 | 64 | 6 |
| 1 | [−11 75 75 −11] | 7 | 64 | 4 |

TABLE H-3

Mapping between viewX_grid_position_x/y and viewXOffsetX/Y

| viewX_grid_position_x/y | viewXOffsetX/Y |
|---|---|
| 4 | 0 |
| 8 | 0 |
| 12 | 1 |

Let function Clip1( ) set to Clip1$_Y$( ) for luma component and Clip1( ) set to Clip1$_C$( ) for chroma components.

The variable refW and refH is derived as following:
for luma component, refW=PicWidthInSamples$_L$ and refH=PicHeightInSamples$_L$,
for chroma components, refW=PicWidthInSamplesc and refH=PicHeightInSamples$_C$, The filtered samples of picture sample array rpuPicture[x, y] with x=0 . . . (refW−1), y=0 . . . (refH−1), are derived as follows:

if filterIdxDown is equal to 2 or filterIdxUp is equal to 2, $rpuPicture[x,y]=128$    (H-1)

Otherwise (i.e., filterIdxDown is not equal to 2 and filterIdxUp is not equal to 2), rpuPicture[x, y] is derived as specified by the following ordered steps:

1. a variable rpuW specifying the active width of the reference processing picture is derived as specified by the following ordered steps:
   a. leftOffset=0,
   b. rightOffset=frame_crop_right_offset*SubWidthC,
   c. $rpuW=refW$−rightOffset,    (H-2)

2. a variable V$_{sbs}$ specifying the view delimiter between the left and the right view V$_{sbs}$=(rpuW>>1), 3. a variable rpuH specifying the active height of the reference processing picture is derived as specified by the following ordered steps:
   a. topOffset=0,
   b. botOffset=frame_crop_bottom_offset×SubHeightC*(2−frame_mbs_only_flag),
   c. if (interlaceProcessingFlag) botOffset=botOffset>>1,
   d. $rpuH=refH$−botOffset,    (H-3)

4. a variable V$_{tab}$ specifying the view delimiter between the top and the bottom view V$_{tab}$=(rpuH>>1), 5. a variable hMin is set equal to −(filterDownLength>>1), 6. a variable hMax is set equal to filterDownLength+hMin−1, 7. a variable gMin is set equal to
   a. −(filterUpLength>>1)+(1−viewXOffsetX) when rpuFormat is equal to 0, with viewXOffsetX set in Table H-3.
   b. −(filterUpLength>>1)+(1−viewXOffsetY) when rpuFormat is equal to 1, with viewXOffsetY set in Table H-3.

8. a variable gMax is set equal to filterUpLength+gMin−1, 9. a (V$_{sbs}$)×(V$_{tab}$) array tempPicture[x, y] with x=0 . . . (V$_{sbs}$−1) and y=0 . . . (V$_{tab}$−1)

10. when rpuFormat is equal to 0,
    a. rpuPicture[x, y] with x=0 . . . (rpuW−1) and y=0 . . . (V$_{tab}$−1) is derived from the input of the array refPicture[x, y] with x=0 . . . (V$_{sbs}$−1) and y=0 . . . (rpuH−1), as specified by the following ordered steps:

$tempPicture[x,y]=Clip1((\Sigma_i(refPicture[x,2y+i]*d[i-hMin])+filterDownOffset)>>filterDownRange)$    (H-4)

with i=hMin . . . hMax, $rpuPicture[2x+viewXOffsetX,y]=tempPicture[x,y]$,    (H-5)

$rpuPicture[2x+(1-viewXOffsetX),y]=Clip1((\Sigma_i(tempPicture[x+i,y]*u[i-gMin])+filterUpOffset)>>filterUpRange)$,    (H-6)

with i=gMin . . . gMax.

b. rpuPicture[x, y] with x=0 . . . (rpuW−1) and y=V$_{tab}$ . . . (rpuH−1) is derived from the input of the array refPicture[x, y] with x=$V_{sbs}$ ... (rpuW−1) and y=0 ... (rpuH−1), following the same steps as above 10a.

11. when rpuFormat is equal to 1,
   a. rpuPicture[x, y] with x=0 ... ($V_{sbs}$−1) and y=0 ... (rpuH−1) is derived from the input of the array refPicture[x, y] with x=0 ... (rpuW−1) and y=0 ... ($V_{tab}$−1), as specified by the following ordered steps:

tempPicture[x,y]=Clip1((Σ$_i$(refPicture[2x+i,y]*d[i−hMin])+filterDownOffset)>>filterDownRange)  (H-7)

with i=hMin ... hMax,

*rpu*Picture[x,2y+view*X*Offset*Y*]=tempPicture[x,y],  (H-8)

*rpu*Picture[x,2y+(1−view*X*Offset*Y*)]=Clip1((Σ$_i$(tempPicture[x,y+i]*u[i−gMin])+filterUpOffset)>>filterUpRange)  (H-9)

with i=gMin ... gMax.

b. rpuPicture[x, y] with x=$V_{sbs}$ ... (rpuW−1) and y=0 ... (rpuH−1) is derived from the input of the array refPicture[x, y] with x=0 ... (rpuW−1) and y=$V_{tab}$ ... (rpuH−1), following the same step as above 11a.

12. *rpu*Picture[x,y]=*rpu*Picture[(*rpuW*−1),y] with x=*rpuW* ... (*refW*−1) and y=0 ... (*rpuH*−1)  (H-10)

13. rpuPicture[x, y]=rpuPicture[x, (rpuH−1)], with x=0 ... (refW−1) and y=rpuH ... (refH−1)  (H-11)

NOTE 1—frame_crop_left_offset shall be equal to 0 and frame_crop_top_offset shall be equal to 0.

NOTE 2—RPU filters shall be limited within the left or the right view only.

NOTE 3—During filtering, samples outside the view boundary shall be replicated with the same value as the boundary pixel.

A.2.1.1.2 Reference Picture Processing for Interlaced Scan

Section H.8.4.1.1 is first applied to the first field of refPicture to form the first field of rpuPicture, and then Section H.8.4.1.1 is applied to the second field of refPicture to form the second field of rpuPicture.

A.3 Reference Picture Processing

This subclause may be technically similar to or the same as subclause H.8.6 as described in the M26661 proposal. However, while subclause H.8.6 in the M26661 proposal was made informative only, this subclause is considered normative. Alternatively, this subclause can be made informative. In addition, and separate from the M26661 proposal, the values of the syntax elements in NAL unit header and slice header of the processed picture may be set to the same as those of the base view picture, unless otherwise set explicitly.

This subclause describes the process for reconstructing the full resolution stereo views in OM-FCFR.

Inputs of this process are:
a variable interlaceProcessingFlag equal to interlace_processing_flag,
a decoded picture sample array decBasePicture for luma or chroma components of the base view component with VOIdx equal to 0,
a decoded picture sample array decEnhPicture for luma or chroma components of the view component with VOIdx equal to 2.

Outputs of this process are:
a full resolution picture sample array leftPicture for luma or chroma components of the left view,
a full resolution picture sample array rightPicture for luma or chroma components of the right view.

The derivation is specified as follows:
When interlaceProcessingFlag is equal to 0, subclause A.3.1.1 is invoked.
When interlaceProcessingFlag is equal to 1, subclause A.3.1.2 is invoked.

A.3.1.1 Full Resolution Picture Reconstruction for Progressive Scan

Inputs of this process are:
two variables decW and decH specifying the width and height, respectively, of the output decoded picture sample array, with decW=rpuW and decH=rpuH in subclause A.2.1.1,
a (decW)×(decH) array decBasePicture of the base view component sample values with VOIdx equal to 0,
a (decW)×(decH) array decEnhPicture of the view component sample values with VOIdx equal to 2,
a (refW)×(refH) array rpuPicture derived in subclause A.2.1.1,
a variable rpuFormat, representing a frame packing arrangement format of the base view with rpuFormat equal to rpu_format,
a variable filterIdxUp equal to 0 for luma or chroma components,
a variable filterUpRange equal to filter_dynamic_range [filterIdxUp] in Table H-2.
a variable filterUpOffset equal to filter_offset[filterIdxUp] in Table H-2.
a variable filterUpLength equal to filter_1D_tap_length [filterIdxUp] in Table H-2.
a (filterUpLength) array of filter coefficients u[i] equal to filter_1D_tap[filterIdxUp, i] with i=0 ... (filterUpLength−1), in Table H-2.

Outputs of this process are:
a (decW)×(decH) array leftPicture of the left view component sample values,
a (decW)×(decH) array rightPicture of the right view component sample values.

The samples of full resolution picture sample array for left view leftPicture[x, y] with x=0 ... (decW−1), y=0 ... (decH−1), are derived as follows:

1. a variable hMin is set equal to
   a. −(filterUpLength>>1)+(1−viewXOffsetX) when rpuFormat is equal to 0, with viewXOffsetX set in Table H-3,
   b. −(filterUpLength>>1)+(1−viewXOffsetY) when rpuFormat is equal to 1, with viewXOffsetY set in Table H-3.
2. a variable hMax is set equal to filterUpLength+hMin−1,
3. a variable gMin is set equal to −(filterUpLength>>1)+1
4. a variable gMax is set equal to filterUpLength+gMin−1,
5. a variable tVal=(1<<(BitDepth$_Y$−1)) for luma component and tVal=(1<<(BitDepth$_C$−1)) for chroma proponents,
6. a (decW)×(decH) array upBasePicture[x, y] with x=0 ... (decW−1) and y=0 ... (decH−1),
7. a (decW)×(decH) array resPicture[x, y] with x=0 ... (decW−1) and y=0 ... (decH−1),
8. a (decW)×(decH) array upResPicture[x, y] with x=0 ... (decW−1) and y=0 ... (decH−1),
9. when rpuFormat is equal to 0, leftPicture[x, y] with x=0 ... (decW−1) and y=0 ... (decH−1) is derived from the input of the arrays decBasePicture[x, y] with x=0 ... (decW/2−1) and y=0 ... (decH−1), decEnhPicture

[x, y] with x=0 . . . (decW−1) and y=0 . . . (decH/2−1) and rpuPicture [x, y] with x=0 . . . (decW−1) and y=0 . . . (decH/2−1), as specified by the following ordered steps:

a. upBasePicture[2x+viewXOffsetX,y]=decBasePicture[x,y]     (H-12)

upBasePicture[2x+(1−viewXOffsetX),y]=Clip1(($\Sigma_i$(decBasePicture[x+i,y]*u[i−hMin])+filterUpOffset)>>filterUpRange)     (H-13)

with i=hMin . . . hMax.

b. resPicture[x,y]=Clip3(−tVal,tVal−1,(decEnhPicture[x,y]−rpuPicture[x,y]))     (H-14)

c. upResPicture[x,2y]=resPicture[x,y]     (H-15)

upResPicture[x,2y+1]=Clip3(−tVal,tVal−1,($\Sigma_i$(resPicture[x,y+i]*u[i−gMin])+filterUpOffset)>>filterUpRange)) with i=gMin . . . gMax.     (H-16)

d. leftPicture=Clip1(upBasePicture[x,y]+upResPicture[x,y])     (H-17)

10. when rpuFormat is equal to 1, leftPicture[x, y], x=0 . . . (decW−1), y=0 . . . (decH−1) is derived from the input of the arrays decBasePicture[x, y] with x=0 . . . (decW−1), y=0 . . . (decH/2−1) and decEnhPicture[x, y] with x=0 . . . (decW/2−1), y=0 . . . (decH−1) and rpuPicture [x, y] with x=0 . . . (decW−1), y=0 . . . (decH/2−1), as specified by the following ordered steps:

a. upBasePicture[x,2y+viewXOffsetY]=decBasePicture[x,y]     (H-18)

upBasePicture[x,2y+(1−viewXOffsetY)]=Clip1($\Sigma_i$(decBasePicture[x,y+i]*u[i−gMin])+filterUpOffset)>>filterUpRange)     (H-19)

with i=gMin . . . gMax, b. resPicture[x,y]=Clip3(−tVal,tVal−1,decEnhPicture[x,y]−rpuPicture[x,y]),     (H-20)

c. upResPicture[2x,y]=resPicture[x,y]     (H-21)

upResPicture[2x+1,y]=Clip3((−tVal,tVal−1,($\Sigma_i$(resPicture[x+i,y]*u[i−hMin])+filterUpOffset)>>filterUpRange) with i=hMin . . . hMax.     (H-22)

d. leftPicture=Clip1(upBasePicture[x,y]+upResPicture[x,y])     (H-23)

The samples of full resolution picture sample array for right view rightPicture[x, y] with x=0 . . . (decW−1), y=0 . . . (decH−1), are derived following the same process applied to leftPicture.

A.3.1.2 Full Resolution Picture Reconstruction for Interlace Scan

Subclause A.3.1.1 is first applied to the first field of decBasePicture and decEnhPicture to form the first field of leftPicture and rightPicture, respectively, and then subclause H.3.1.1 is applied to the second field of decBasePicture and decEnhPicture to form the second field of leftPicture and rightPicture, respectively.

A.4 Decoder Conformance (Subclause C.4 in the AVC Specification)

The general part of the specification in subclause C.1 applies. In the remaining part of this subclause, the description can be considered as the MFC part of Annex H or as an extension of Annex H, e.g. Annex K. In the latter case, what applies to Annex H also applies to Annex K.

A.4.1 Operation of the Output Order Decoded Picture Buffer (DPB)

The specifications in subclause C.4.1 apply.

A.4.2 Decoding of Gaps in Frame_Num and Storage of "Non-Existing" Pictures

The specifications in subclause C.4.2 apply.

A.4.3 Picture Decoding

The specifications in subclause C.4.3 apply.

A.4.4 Removal of Pictures from the DPB Before Possible Insertion of the Current Picture The specifications in subclause C.4.3 apply.

A.4.5 Current Decoded Picture Marking and Storage

When decoding a coded video sequence conforming to a profile specified in Annex H using the decoding process specified in Annex H, the following process in this subclause is repeatedly invoked for each view in increasing order of view order index, with "picture" being replaced by "view component", "frame" being replaced by "frame view component", and "field" being replaced by "field view component". During the invocation of the process for a particular view, only view components of the particular view may be removed from the DPB.

In addition, according to aspects of this disclosure, all pictures in the filtered view (with view order index equal to 1) are considered as non-reference pictures.

A.4.5.1 Storage and Marking of a Reference Decoded Picture into the DPB

The specifications in subclause C.4.5.1 apply.

A.4.5.2 Storage and Marking of a Non-Reference Decoded Picture into the DPB

The specifications in subclause C.4.5.2 apply with following constraints.

All view components of the filtered view (with view order index equal to 1) are marked as "unused for reference" or considered as non-reference pictures.

All view components of the full resolution views (with view order index equal to 3 or 4) are marked as "unused for reference" or considered as non-reference pictures.

The OutputFlag of each picture of the filtered view (with view order index equal to 1) is set to 0.

The OutputFlag of each picture of the base view (with view order index equal to 0) is set to 0.

The OutputFlag of each picture of the coded non-base view (with view order index equal to 2) is set to 0.

The OutputFlag of each picture of the full resolution views (with view order index equal to 3 and 4) is set to 1.

When a filtered view or a full resolution view is generated, it is considered as decoded.

Alternatively, if the reconstruction of the full resolution views is considered as non-normative, the following constraints apply.

All view components of the filtered view (with view order index equal to 1) are marked as "unused for reference" or considered as non-reference pictures.

The OutputFlag of each picture of the filtered view (with view order index equal to 1) is set to 0.

When a filtered view or a full resolution view is generated, it is considered as decoded.

A.4.5.3 "Bumping" Process

The specifications in subclause C.4.5.5 apply.

A.5 Operation of the Decoded Picture Buffer (Subclause C.2 in the AVC Specification)

The specifications in the general part of subclause C.2 apply with the following constraints.

All view components of the filtered view (with view order index equal to 1) are marked as "unused for reference" or considered as non-reference pictures.

All view components of the full resolution views (with view order index equal to 3 or 4) are marked as "unused for reference" or considered as non-reference pictures.

The OutputFlag of each picture of the filtered view (with view order index equal to 1) is set to 0.

The OutputFlag of each picture of the base view (with view order index equal to 0) is set to 0.

The OutputFlag of each picture of the coded non-base view (with view order index equal to 2) is set to 0.

The OutputFlag of each picture of the full resolution views (with view order index equal to 3 and 4) is set to 1.

When a filtered view or a full resolution view is generated, it is considered as decoded.

Alternatively, if the reconstruction of the full resolution views is considered as non-normative, the following constraints apply.

All view components of the filtered view (with view order index equal to 1) are marked as "unused for reference" or considered as non-reference pictures.

The OutputFlag of each picture of the filtered view (with view order index equal to 1) is set to 0.

When a filtered view or a full resolution view is generated, it is considered as decoded.

A.5.1 Decoding of Gaps in Frame_Num and Storage of "Non-Existing" Frames

The specifications in subclause C.2.1 apply with the following constraints.

The views considered in this subclause are only the base view (with view order index equal to 0) and coded non-base view (with view order index equal to 2).

A.5.2 Picture Decoding and Output

The specifications in subclause C.2.2 apply.

A.5.3 Removal of Pictures from the DPB Before Possible Insertion of the Current Picture The specifications in subclause C.2.3 apply with the following constraints.

The views considered in this subclause are only the base view (with view order index equal to 0) and coded non-base view (with view order index equal to 2).

A.5.4 Current Decoded Picture Marking and Storage

The specifications in subclause C.5.4 apply.

While the techniques above are described with respect to MVC (that is, the MVC extension to H.264/AVC) the techniques of this disclosure may be extended to other video coding standards, such as HEVC and its extensions (e.g., MV-HEVC, 3D-HEVC, and/or HSVC).

For example, video encoder 20 and/or video decoder 30 may conform to a high level syntax (HLS)-only scalable video coding extension to HEVC, such that few or no changes are required to the base coding standard. For example, multiview video coding, three-dimensional video coding (multiview plus depth), or scalable video coding extensions may be achieved using HLS changes to the base standard. In such extensions, rather than introducing new coding structures, certain existing coding structures may be redefined or used in a different way to achieve an HLS-only extension. An HLS-only extension may allow a base layer picture (or a filtered base layer picture) to be added to a reference picture list for coding a picture in a layer other than the base layer.

With respect to HSVC, in scalable video coding, a video encoder (such as video encoder 20) may encode content in a scalable way including multiple layers of video data such that a video decoder (such as video decoder 30) may use an extractor tool to adapt the actual delivered content according to application requirements, which may be dependent e.g., on the client or the transmission channel. Pictures having the lowest spatial and quality layer are typically compatible with the base standard. Several spatial and/or quality enhancement layers may be added to provide spatial and/or quality scalabilities. Each spatial or quality enhancement layer itself may be temporally scalable, with the same temporal scalability structure as the base layer.

With respect to HEVC extensions, the techniques of this disclosure may be used in the scenario in which a filtered version of a base layer or reference view of the same access unit is used for inter-view prediction, especially when multiple filtered versions are available. Aspects of this disclosure may be used for reference picture marking. For example, assume NumRepFromOneBase[i] is the variable indicating the number of representations filtered/generated from the layer/view with layer_id equal to LayerIdInterView [i] as specified in the video parameter set. In addition, assume that each of these NumRepFromOneBase[i] representations from each layer/view are added into the inter-layer/view reference picture set.

According to aspects of this disclosure, syntax elements in a NAL unit header and slice headers of the processed picture may be set to the same as those of the base layer/reference view picture, unless otherwise set explicitly. Accordingly, if a layer_id of those filtered pictures is not explicitly set, they may be the same as that of the reference view/base layer. Such a filtered picture may be identified by both layer_id and the index among the NumRepFromOneBase[i] representations. In addition, NumRepFromOneBase[i] may be signalled in a VPS, SPS, or slice header.

Accordingly, for each reference layer i, NumRepFromOneBase[i] filtered layers/views may be reconstructed and identified by the index to all these filtered layers/views.

In a decoder implementation, such as that used by video decoder 30 (FIG. 3), if the k-th filtered representation of the i-th layer is used for two enhancement layers/views, filtering the picture may be required only once to generate such a representation. Since the filtered layers/views may be only required for decoding the current view component/layer representation and any other view components/layer representations in decoding order, pictures in the inter-view/layer reference picture set of the previous view component (in decoding order) may be marked as "unused for reference" before a new inter-view/layer reference picture set is generated.

According to some techniques of this disclosure, the reference picture marking process may follow that of the MV-HEVC/3D-HEVC marking process, with the changes as indicated below:

Decoding Process for Reference Picture Set

This process is invoked once per picture, after decoding of a slice header but prior to the decoding of any coding unit and prior to the decoding process for reference picture list construction of the slice as specified in subclause F.8.3.3.1. The process may result in marking one or more reference pictures as "unused for reference" or "used for long-term reference".

NOTE 1—The reference picture set is an absolute description of the reference pictures used in the decoding process of the current and future coded pictures. The reference picture set signalling is explicit in the sense that all reference pictures included in the reference picture set are listed explicitly and there is no default reference picture set construction process in the decoder that depends on the status of the decoded picture buffer.

Short-term reference pictures are identified within a view by their PicOrderCntVal values. Long-term reference pictures are identified within a view either by their PicOrderCntVal values or their pic_order_cnt_lsb values. Inter-view reference pictures are identified further by their layer_id values.

Five lists of picture order count values are constructed to derive the reference picture set; PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is an IDR or BLA picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

Otherwise, the following applies for derivation of the five lists of picture order count values and the numbers of entries.

```
    for( i = 0, j = 0, k = 0; i < NumNegativePics[ StRpsIdx ] ; i++ )
  if( UsedByCurrPicS0[ StRpsIdx ][ i ] )
      PocStCurrBefore[ j++ ] = PicOrderCntVal + DeltaPocS0[ StRpsIdx ][ i ]
  else
      PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
  if( UsedByCurrPicS1[ StRpsIdx ][ i ] )
      PocStCurrAfter[ j++ ] = PicOrderCntVal + DeltaPocS1[ StRpsIdx ][ i ]
  else
      PocStFoll[ k++ ] = PicOrderCntVal + DeltaPocS1[ StRpsIdx ][ i ]
NumPocStCurrAfter = j
NumPocStFoll = k                               (F-1)
for( i = 0, j = 0, k = 0; 1 < num_long_term_sps + num_long_term_pics; i++ ) {
  pocLt = PocLsbLt[ i ]
  if( delta_poc_msb_present_flag[ i ] )
      pocLt += PicOrderCntVal − DeltaPocMSBCycleLt[ i ] *
MaxPicOrderCntLsb − pic_order_cnt_lsb
    if( UsedByCurrPicLt[ i ] ) {
      PocLtCurr[ j ] = pocLt
      CurrDeltaPocMsbPresentFlag[ j++ ] = delta_poc_msb_present_flag[ i ]
    } else {
      PocLtFoll[ k ] = pocLt
      FollDeltaPocMsbPresentFlag[ k++ ] = delta_poc_msb_present_flag[ i ]
    }
}
NumPocLtCurr = j
NumPocLtFoll = k
``` where PicOrderCntVal is the picture order count of the current picture as specified in subclause 8.3.1.

NOTE 2—A value of StRpsIdx in the range from 0 to num_short_term_ref_pic_sets−1, inclusive, indicates that a short-term reference picture set from the active sequence parameter set is being used, where StRpsIdx is the index of the short-term reference picture set to the list of short-term reference picture sets in the order in which they are signalled in the sequenceparameter set. StRpsIdx equal to num_short_term_ref_pic_sets indicates that a short-term reference picture set explicitly signalled in the slice header is being used.

For each i in the range of 0 to NumPocLtCurr−1, inclusive, when CurrDeltaPocMsbPresentFlag[i] is equal to 1, it is a requirement of bitstream conformance that the following conditions apply:

There shall be no j in the range of 0 to NumPocStCurrBefore−1, inclusive, for which PocLtCurr[i] is equal to PocStCurrBefore[j].

There shall be no j in the range of 0 to NumPocStCurrAfter−1, inclusive, for which PocLtCurr[i] is equal to PocStCurrAfter[j].

There shall be no j in the range of 0 to NumPocStFoll−1, inclusive, for which PocLtCurr[i] is equal to PocStFoll[j].

For each i in the range of 0 to NumPocLtFoll−1, inclusive, when FollDeltaPocMsbPresentFlag[i] is equal to 1, it is a requirement of bitstream conformance that the following conditions apply:

There shall be no j in the range of 0 to NumPocStCurrBefore−1, inclusive, for which PocLtFoll[i] is equal to PocStCurrBefore[j].

There shall be no j in the range of 0 to NumPocStCurrAfter−1, inclusive, for which PocLtFoll[i] is equal to PocStCurrAfter[j].

There shall be no j in the range of 0 to NumPocStFoll−1, inclusive, for which PocLtFoll[i] is equal to PocStFoll[j].

For each i in the range of 0 to NumPocLtCurr−1, inclusive, when CurrDeltaPocMsbPresentFlag[i] is equal to 0, it is a requirement of bitstream conformance that the following conditions apply:

There shall be no j in the range of 0 to NumPocStCurrBefore−1, inclusive, for which PocLtCurr[i] is equal to (PocStCurrBefore[j]& (MaxPicOrderCntLsb−1)).

There shall be no j in the range of 0 to NumPocStCurrAfter−1, inclusive, for which PocLtCurr[i] is equal to (PocStCurrAfter[j]& (MaxPicOrderCntLsb−1)).

There shall be no j in the range of 0 to NumPocStFoll−1, inclusive, for which PocLtCurr[i] is equal to (PocStFoll[j]& (MaxPicOrderCntLsb−1)).

For each i in the range of 0 to NumPocLtFoll−1, inclusive, when FollDeltaPocMsbPresentFlag[i] is equal to 0, it is a requirement of bitstream conformance that the following conditions apply:

There shall be no j in the range of 0 to NumPocStCurrBefore−1, inclusive, for which PocLtFoll[i] is equal to (PocStCurrBefore[j]& (MaxPicOrderCntLsb−1)).

There shall be no j in the range of 0 to NumPocStCurrAfter−1, inclusive, for which PocLtFoll[i] is equal to (PocStCurrAfter[j]& (MaxPicOrderCntLsb−1)).

There shall be no j in the range of 0 to NumPocStFoll−1, inclusive, for which PocLtFoll[i] is equal to (PocStFoll[j]& (MaxPicOrderCntLsb−1)).

The variable layerId is set equal to the layer_id of the current view component. The list LayerIdInterView specifying the layer identifiers of the inter-view subset reference picture set and the variable NumIvCurr specifying the number of entries of LayerIdInterView, are derived as follows.

for(*i*=0; *i*<num_direct_ref_layers[layerId]; *i*++) LayerIdInterView[*i*]=ref_layer_id[layerId][*i*]    (F-2)

NumIvCurr=num_direct_ref_layers[layerId]    (F-3)

The reference picture set consists of six lists of reference pictures; RefPicSetStCurrBefore, RefPicSetStCurrAfter, RefPicSetStFoll, RefPicSetLtCurr, RefPicSetLtFoll, and RefPicSetIvCurr. The variable NumPocTotalCurr is set equal to NumPocStCurrBefore+NumPocStCurrAfter+NumPocLtCurr+NumIvCurr. When decoding a P or B slice, it is a requirement of bitstream conformance that the value of NumPocTotalCurr shall not be equal to 0.

NOTE 3—RefPicSetStCurrBefore, RefPicSetStCurrAfter and RefPicSetLtCurr contains all reference pictures that may be used in inter prediction of the current picture and that may be used in inter prediction of one or more of the pictures following the current picture in decoding order. RefPicSctStFoll and RefPicSetLtFoll consists of all reference pictures that are not used in inter prediction of the current picture but may be used in inter prediction of one or more of the pictures following the current picture in decoding order.

A reference picture can be marked as "unused for reference", "used for short-term reference", or "used for long-term reference", but only one among these three. When a reference picture is referred to as being marked as "used for reference", this collectively refers to the picture being marked as "used for short-term reference" or "used for long-term reference" (but not both).

The derivation process for the reference picture set and picture marking are performed according to the following ordered steps, where DPB refers to the decoded picture buffer as described in Annex C and the variable layerId is set equal to the layer_id of the current view component.

1. The following applies:

```
for( i = 0; i < NumPocLtCurr; i++ )
  if( !CurrDeltaPocMsbPresentFlag[ i ] )
    if( there is a long-term reference picture picX in the DPB
    with layer_id equal to layerId and pic_order_cnt_lsb equal to
PocLtCurr[ i ] )
      RefPicSetLtCurr[ i ] = picX
    else if( there is a short-term refrence picture picY in the DPB
    with layer_id equal to layerId and pic_order_cnt_lsb equal to
PocLtCurr[ i ] )
      RefPicSetLtCurr[ i ] = picY
    else
      RefPicSetLtCurr[ i ] = "no reference picture"
  else
    if( there is a long-term reference picture picX in the DPB
    with layer_id equal to layerId andPicOrderCntVal equal to
PocLtCurr[ i ])
      RefPicSetLtCurr[ i ] = picX
    else if( there is a short-term reference picture picY in the DPB
    with layer_id equal to layerId and PicOrderCntVal equal to
PocLtCurr[ i ] )
      RefPicSetLtCurr[ i ] = picY
    else
      RefPicSetLtCurr[ i ] = "no reference picture"
                                    (F-4)
for( i = 0; i < NumPocLtFoll; i++ )
  if( !FollDeltaPocMsbPresentFlag[ i ] )
    if( there is a long-term reference picture picX in the DPB
    with layer_id equal to layerId and pic_order_cnt_lsb equal to
PocLtFoll[ i ] )
      RefPicSetLtFoll[ i ] = picX
    else if( there is a short-term reference picture picY in the DPB
    with layer_id equal to layerId and pic_order_cnt_lsb equal to
PocLtFoll[ i ] )
      RefPicSetLtFoll[ i ] = picY
    else
      RefPicSetLtFoll[ i ] = "no reference picture"
  else
    if( there is a long-term reference picture picX in the DPB
    with layer_id equal to layerId and PicOrderCntVal to PocLtFoll[ i ] )
      RefPicSetLtFoll[ i ] = picX
    else if( there is a short-term reference picture picY in the DPB
    with layer_id equal to layerId and PicOrderCntVal equal to
PocLtFoll[ i ])
      RefPicSetLtFoll[ i ] = picY
    else
      RefPicSetLtFoll[ i ] = "no reference picture"
```

2. All reference pictures included in RefPicSetLtCurr and RefPicSetLtFoll are marked as "used for long-term reference".
3. According to aspects of this disclosure, all reference pictures in the decoded picture buffer and belong to the RefPicSetIvCurr are marked as "unused for reference".
4. In addition, according to aspects of this disclosure, the following applies:

```
for( i = 0, j=0; i < NumIvCurr; i++ )
  for (k=0; k < NumRepFromOneBase[ i ]; k++) {
    RefPicSetIvCurr[ j ] = "the k-th inter-view/layer reference picture
    filtered from the view component/layer representation with layer
    identifier equal to LayerIdInterView[ i ]"
    j++
  }
```

5. All reference pictures included in RefPicSetIvCurr are marked as "used for long-term reference".
6. The following applies:

```
for( i = 0; i < NumPocStCurrBefore; i++ )
  if( there is a short-term reference picture picX in the DPB
    with layer_id equal to layerId and
    with PicOrderCntVal equal to PocStCurrBefore[ i ])
    RetPicSetStCurrBefore[ i ] = picX
  else
    RefPicSetStCurrBefore[ i ] = "no reference picture"
for( i = 0; i < NumPocStCurrAfter; i++ )
  if( there is a short-term reference picture picX in the DPB
    with layer_id equal to layerId and
    with PicOrderCntVal equal to PocStCurrAfter[ i ])
    RefPicSetStCurrAfter[ i ] = picX
  else
    RefPicSetStCurrAfter[ i ] = "no reference picture"   (F-5)
for( i = 0; i < NumPocStFoll; i++ )
  if( there is a short-term reference picture picX in the DPB
    with layer_id equal to layerId and
    with PicOrderCntVal equal to PocStFoll[ i ])
    RefPicSetStFoll[ i ] = picX
  else
    RefPicSetStFoll[ i ] = "no reference picture"
```

7. All reference pictures with layer_id values equal to layerId in the decoded picture buffer that are not included in RefPicSetLtCurr, RefPicSetLtFoll, RefPic- SetStCurrBefore, RefPicSetStCurrAfter or RefPicSetStFoll are marked as "unused for reference".

NOTE 4—There may be one or more reference pictures that are included in the reference picture set but not present in the decoded picture buffer. Entries in RefPicSetStFoll or RefPicSetLtFoll that are equal to "no reference picture" should be ignored. Unless either of the following two conditions is true, an unintentional picture loss should be inferred for each entry in RefPicSetStCurrBefore, RefPicSetStCurrAfter and RefPicSetLtCurr that is equal to "no reference picture": a) the previous RAP picture in decoding order is the first coded picture in the bitstream and the current coded picture is a TFD picture; b) the previous RAP picture in decoding order is a BLA picture and the current coded picture is a TFD picture.

Alternatively, according to aspects of this disclosure, the decoded layer representation/view component itself can be used directly for inter-view prediction. The reference picture marking process may be changed, with the different marking of the base layer/reference view may applying to distinguish a layer representation/view component from its filtered versions. According to some techniques of this disclosure, the reference picture marking process may follow that of the MV-HEVC/3D-HEVC marking process, with the changes as indicated below:

Decoding Process for Reference Picture Set

This process is invoked once per picture, after decoding of a slice header but prior to the decoding of any coding unit and prior to the decoding process for reference picture list construction of the slice as specified in subclause F.8.3.3.1. The process may result in marking one or more reference pictures as "unused for reference" or "used for long-term reference".

\* \* \*

The derivation process for the reference picture set and picture marking are performed according to the following ordered steps, where DPB refers to the decoded picture buffer as described in Annex C and the variable layerId is set equal to the layer_id of the current view component.

1. The following applies:

```
for( i = 0; i < NumPocLtCurr; i++ )
if( !CurrDeltaPocMsbPresentFlag[ i ] )
    if( there is a long-term reference picture picX in the DPB
    with layer_id equal to layerId and pic_order_cnt_lsb equal to
PocLtCurr[ i ] )
        RefPicSetLtCurr[ i ] = picX
    else if( there is a short-term reference picture picY in the DPB
    with layer_id equal to layerId and pic_order_cnt_lsb equal to
PocLtCurr[ i ] )
        RefPicSetLtCurr[ i ] = picY
    else
        RefPicSetLtCurr[ i ] = "no reference picture"
else
    if( there is a long-term reference picture picX in the DPB
    with layer_id equal to layerId andPicOrderCntVal equal to
PocLtCurr[ i ])
        RefPicSetLtCurr[ i ] = picX
        else if( there is a short-term reference picture picY in the DPB
        with layer_id equal to layerId and PicOrderCntVal equal to
PocLtCurr[ i ] )
            RefPicSetLtCurr[ i ] = picY
        else
            RefPicSetLtCurr[ i ] = "no reference picture"
                    (F-4)
for( i = 0; i < NumPocLtFoll; i++ )
if( !FollDeltaPocMsbPresentFlag[ i ] )
    if( there is a long-term reference picture picX in the DPB
    with layer_id equal to layerId and pic_order_cnt_lsb equal to
PocLtFoll[ i ] )
        RefPicSetLtFoll[ i ] = picX
    else if( there is a short-term reference picture picY in the DPB
    with layer_id equal to layerId and pic_order_cnt_lsb equal to
PocLtFoll[ i ] )
        RefPicSetLtFoll[ i ] = picY
    else
        RefPicSetLtFoll[ i ] = "no reference picture"
else
    if( there is a long-term reference picture picX in the DPB
    with layer_id equal to layerId and PicOrderCntVal to PocLtFoll[ i ] )
        RefPicSetLtFoll[ i ] = picX
    else if( there is a short-term reference picture picY in the DPB
    with layer_id equal to layerId and PicOrderCntVal equal to
PocLtFoll[ i ])
        RefPicSetLtFoll[ i ] = picY
    else
        RefPicSetLtFoll[ i ] = "no reference picture"
```

2. All reference pictures included in RefPicSetLtCurr and RefPicSetLtFoll are marked as "used for long-term reference".
3. According to aspect of this disclosure, all reference pictures in the decoded picture buffer that are not marked as "original picture" and belong to the RefPicSetIvCurr is marked as "unused for reference".
4. In addition, according to aspects of this disclosure, the following applies:

```
for( i = 0, j=0; i < NumIvCurr; i++ )
    the inter-view/layer reference picture with layer identifier equal to
    LayerIdInterView[ i ], ivPic, is marked as "original picture"
    RefPicSetIvCurr[ j ] = ivPic
    for (k=0; k < NumRepFromOneBase[ i ]; k++) {
    RefPicSetIvCurr[ j ] = "the k-th inter-view/layer reference picture
    filtered from the view component/layer representation with layer
    identifier equal to LayerIdInterView[ i ]"
    j++
    }
```

5. All reference pictures included in RefPicSetIvCurr are marked as "used for long-term reference".
6. The following applies:

```
for( i = 0; i < NumPocStCurrBefore; i++)
    if( there is a short-term reference picture picX in the DPB
    with layer_id equal to layerId and
    with PicOrderCntVal equal to PocStCurrBefore[ i ])
        RefPicSetStCurrBefore[ i ] = picX
    else
        RefPicSetStCurrBefore[ i ] = "no reference picture"
    for( i = 0; i < NumPocStCurrAfter; i++ )
    if( there is a short-term reference picture picX in the DPB
    with layer_id equal to layerId and
    with PicOrderCntVal equal to PocStCurrAfter[ i ])
        RefPicSetStCurrAfter[ i ] = picX
    else
        RefPicSetStCurrAfter[ i ] = "no reference picture"   (F-5)
    for( i = 0; i < NumPocStFoll; i++ )
    if( there is a short-term reference picture picX in the DPB
    with layer_id equal to layerId and
    with PicOrderCntVal equal to PocStFoll[ i ])
        RefPicSetStFoll[ i ] = picX
    else
        RefPicSetStFoll[ i ] = "no reference picture"
```

7. All reference pictures with layer_id values equal to layerId in the decoded picture buffer that are not included in RefPicSetLtCurr, RefPicSetLtFoll, RefPicSetStCurrBefore, RefPicSetStCurrAfter or RefPicSetStFoll are marked as "unused for reference".

NOTE 4—There may be one or more reference pictures that are included in the reference picture set but not present in the decoded picture buffer. Entries in RefPicSetStFoll or RefPicSetLtFoll that are equal to "no reference picture" should be ignored. Unless either of the following two conditions is true, an unintentional picture loss should be inferred for each entry in RefPicSetStCurrBefore, RefPicSetStCurrAfter and RefPicSetLtCurr that is equal to "no reference picture": a) the previous RAP picture in decoding order is the first coded picture in the bitstream and the current coded picture is a TFD picture; b) the previous RAP picture in decoding order is a BLA picture and the current coded picture is a TFD picture.

Figure 7A:
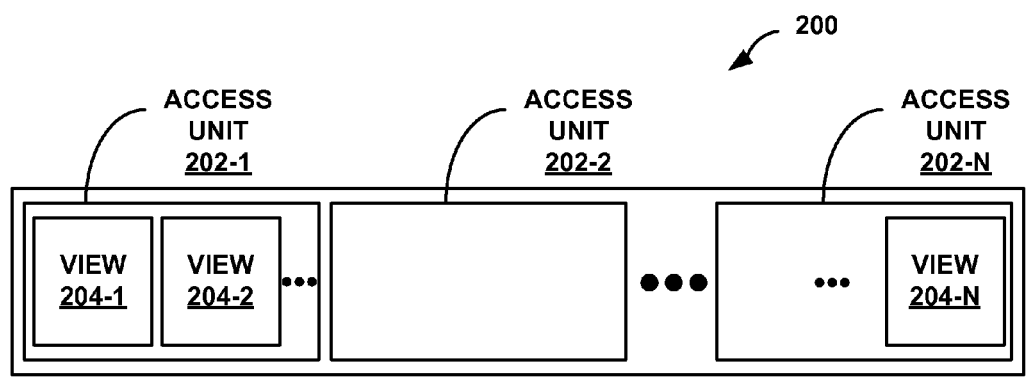
FIG. 7A is a conceptual diagram illustrating an example of a bitstream structure that may be used in an implementation of one or more of the techniques of this disclosure.
Figure 7B:
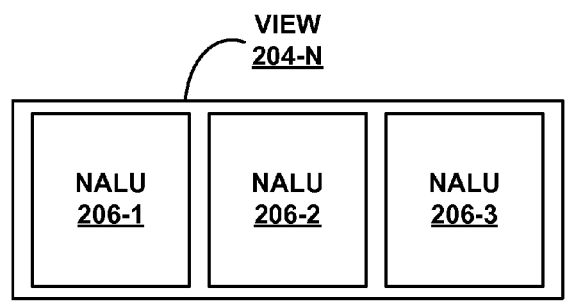
FIG. 7B is a conceptual diagram illustrating an example of a view that may be included in the bitstream structure of FIG. 7A.
Figure 7C:
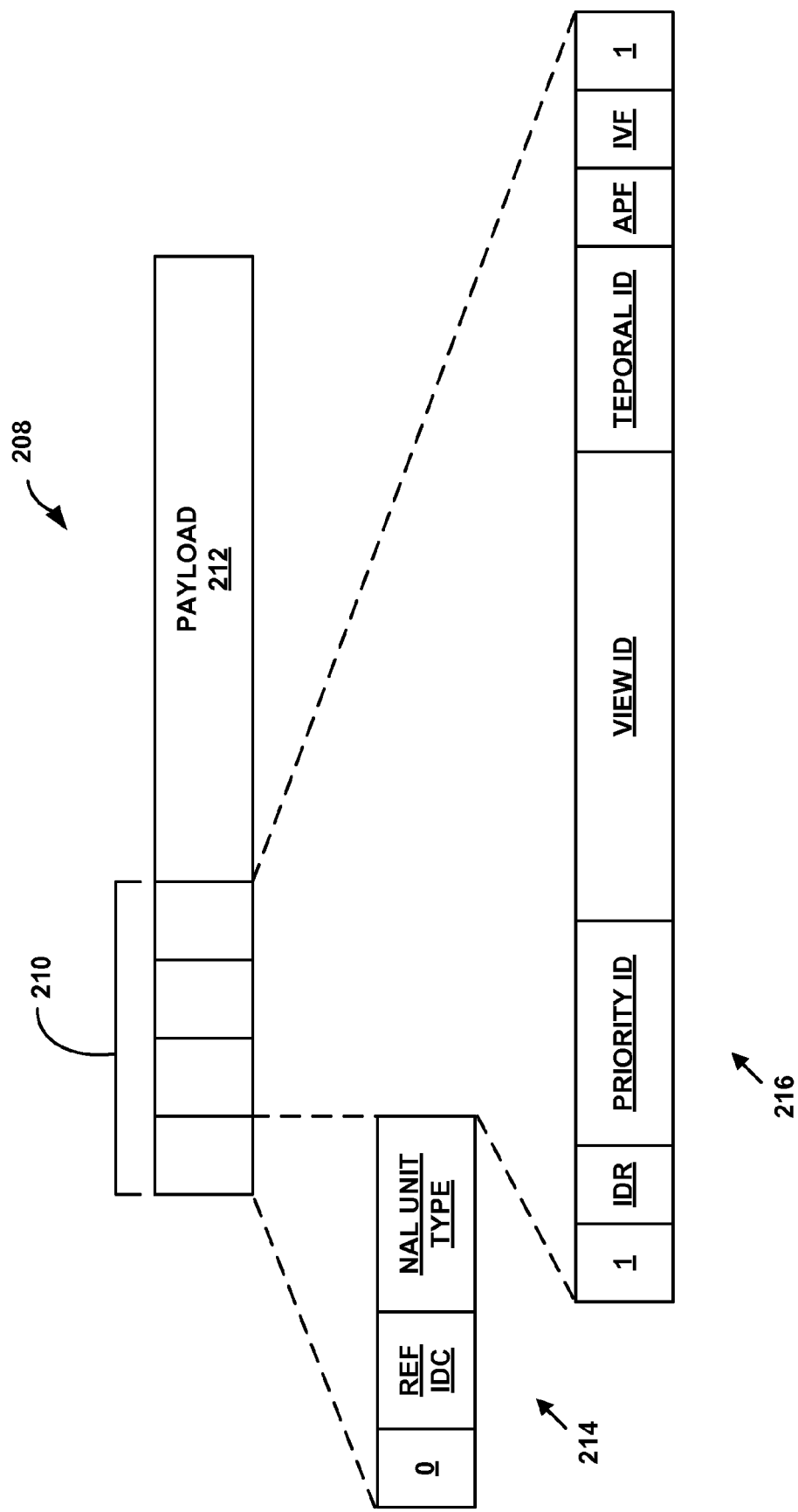
FIG. 7C is a conceptual diagram illustrating an example of a Network Abstraction Layer (NAL) unit that may be included in the bitstream structure of FIG. 7A.

FIGS. 7A-7C are conceptual diagrams illustrating a bitstream structure of an MVC bitstream that may be adapted for MFC coding, according to aspects of this disclosure. For example, FIG. 7A is a conceptual diagram illustrating an example of a bitstream structure 200 that may be used in an implementation of one or more of the techniques of this disclosure. Bitstream 200 may comply with a video coding standard, such as the HEVC standard. Moreover, in some examples, bitstream 200 may comply with an MFC coding standard.

In the example shown in FIG. 7A, bitstream 200 includes a plurality of access units 202-1 through 202-N (collectively, access units 202). As noted above, access units 202 may include a set of view components (referred to as views), such as views 204-1 through 204-M (collectively, views 204). In general, access units 202 include all data for a common temporal instance, e.g., data for one view component per view. In some examples, each access unit of access units 202 includes the same number of views 204. Decoding each access unit of access units 202 may result in one decoded picture per view. Access units 202 may contain encoded video data that may be used to render three-dimensional video playback.

FIG. 7B is a conceptual diagram illustrating an example of a view 204-N that may be included in the structure of the bitstream 200 of FIG. 7A. In general, each view component in an access unit (such as views 204 in access unit 202-N) contains a set of video encoder/decoder (codec) layer (VCL) NAL units. That is, in the example shown in FIG. 7B, view 204-N includes NAL units 206-1 through 206-3 in a specific form and order. Typically, the view components are arranged in the same order in each access unit, such that the kth view component in each access unit corresponds to the same view. In other examples, view 204-N may include other numbers of NAL units.

FIG. 7C is a conceptual diagram illustrating an example NAL unit 208, which may be similar in structure to NAL units 206 shown in FIG. 7B. NAL unit 208 generally includes a NAL unit header 210 and payload 212. In addition, NAL unit header 210 includes a first portion 214 and a NAL unit header extension 216, which may conform to the MVC/AVC extension.

For example, first portion 214 includes a ref_idc element and a NAL unit type element. The ref_idc element may indicate whether the NAL unit is used as a reference for other NAL units. For example, a ref_idc value of 00 may indicate that the content of the NALU is not used to reconstruct stored pictures (that can be used for future reference). Such NALUs having values of 00 can be discarded without risking the integrity of the reference pictures. Values above 00 may indicate that the decoding of the NALU is required to maintain the integrity of the reference pictures. The NAL unit type element may indicate the type of packets of NAL unit 208.

NAL unit header extension 216 generally includes an IDR flag (IDR), a priority ID (priority_id), a view ID (view_id), a temporal ID (temporal_id), an anchor picture flag (APF), and an inter-view flag (IVF or "inter_view_flag"). As described with respect to FIG. 1 above, the IDR flag may indicate whether NAL unit 208 belongs to an instantaneous decoder refresh (IDR) or a view-IDR (V-IDR) picture that can be used as a closed-GOP random access point. The priority_id may be used with a bitstream adaptation process that varies the bitstream according to changing network conditions and/or capabilities of video decoder 30 and/or display device 32 (e.g., such as single-pass adaptation process). The view_id may be used to indicate the view identifier for the view to which the NAL unit belongs. The temporal_id may be used to indicate the temporal level of the current NAL unit, which may correspond to a particular frame rate. The APF may be used to indicate whether the NAL unit belongs to an anchor picture that can be used as an open-GOP random access point. The inter_view_flag may be used to indicate whether the NAL unit is used for inter-view prediction for NAL units in other views.

In an example, according to aspects of this disclosure, video encoder 20 and/or video decoder 30 may derive and generate view_ids for two full resolution views in an MFC framework (e.g., the output views generated using the base view and enhancement view). The view identifiers are generated such that they are not equal to view identifiers of the decoded views, such as a view identifier of a base view and a view identifier of an enhancement view.

In addition, for any view component belonging to the two full resolution views, video encoder 20 and/or video decoder 30 may set the inter_view_flag to zero and a ref_idc element to zero. With these syntax elements set to zero, video encoder 20 and/or video decoder do not use the two full resolution views for reference when coding other view components, such as view components of the base view or enhancement view. Video encoder 20 and/or video decoder 30 may also mark view components of the two full resolution views as "unused for reference" in a decoded picture buffer. In some examples, each view component of the base view has an inter_view_flag syntax element set equal to one.

Video encoder 20 and/or video decoder 30 may also implement techniques of this disclosure to manage pictures stored to a decoded picture buffer. For example, video encoder 20 and/or video decoder 30 may use techniques of this disclosure to distinguish between a decoded view component of a base view and a filtered version of the decoded view component of the base view for each access unit, such as access units 202. In some examples, video encoder 20 and/or video decoder 30 may assign the picture filtered from the decoded view component of the base view with a different view_id and a different view order index than the decoded view component before it has been filtered.

Additionally or alternatively, according to aspects of this disclosure, video encoder 20 and/or video decoder 30 may set an inter_view_flag syntax element of a decoded view component of the base view to zero immediately after decoding the view component of the base view, and may set the inter_view_flag syntax element of the filtered view component (e.g., the filtered version of the view component from the base view) to one. Accordingly, video encoder 20 and/or video decoder 30 may use the filtered view component as a reference when coding view components of other views, such as a view component of an enhancement view.

Additionally or alternatively, when a ref_idc element is greater than zero for a video component of the base view, video encoder 20 and/or video decoder 30 may temporarily mark the decoded view component of the base view as "unused for reference" after generating the filtered view component from the decoded view component of the base view. After decoding the entire access unit containing the view component of the base view, video encoder 20 and/or video decoder 30 may change the designation of the decoded view component of the base view and mark the decoded view component of the base view as "used for short-term reference" or "used for long-term reference" by the reference picture marking process as specified in Annex H of H.264/AVC. Accordingly, the view component of the base view is not used as a reference picture for predictive coding for other pictures in the access unit (such as a view component from an enhancement view, which may rely on a filtered picture for purposes of predictive coding), but may be used by other view components of the base view (of other access units).

Additionally or alternatively, video encoder 20 and/or video decoder 30 may mark a filtered view component from a view component of a base view with one or more syntax elements to indicate that the view component is a filtered view component. For example, video encoder 20 and/or video decoder 30 may mark each filtered view component with a specific flag (e.g., set equal to one), and video encoder 20 and/or video decoder 30 may use a picture for inter-view prediction of a non-base view only when the flag is equal to one for a view component for a given view_id. In this example, video encoder 20 and/or video decoder 30 sets the flag for the view components of the base view to zero, so that the view components of the base view are not used for inter-view reference.

Figure 8:
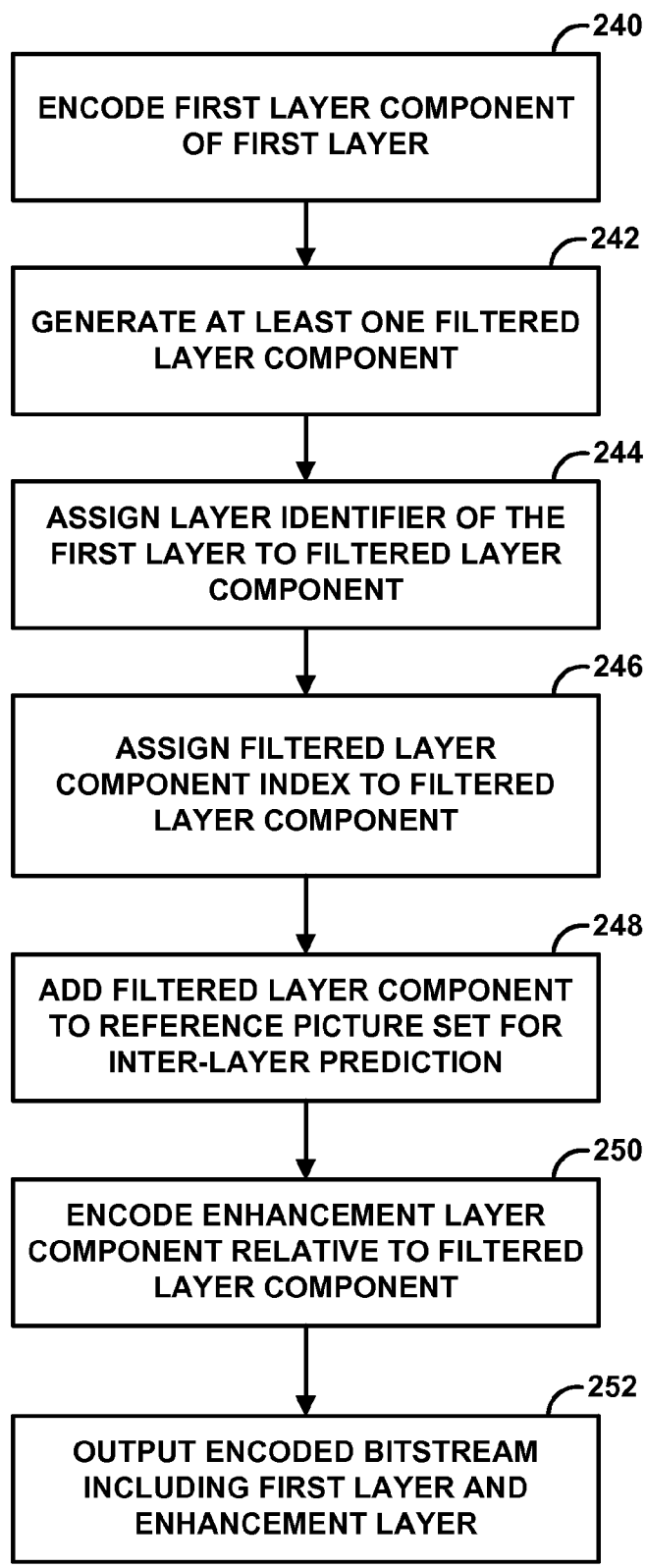
FIG. 8 is a flow diagram illustrating an example method of encoding an MFC bitstream, according to aspects of this disclosure.

FIG. 8 is a flow diagram illustrating an example method of encoding an MFC bitstream. The example shown in FIG. 8 is generally described as being performed by video encoder 20 (FIGS. 1 and 2). However, it should be understood that the process described with respect to FIG. 8 may be carried out by a variety of other processors, processing units, hardware-based coding units such as encoder/decoders (CODECs), and the like.

In the example of FIG. 8, video encoder 20 may encode a first layer component of a first view (240). For example, as noted above, video encoder 20 may encode a base layer including packed pictures having both a right-eye picture and an left-eye picture. Video encoder 20 may also decode the first layer component, e.g., during reconstruction for predictive coding, and may add the first layer component to reference picture memory. Video encoder 20 may also generate at least one filtered layer component by filtering the first layer component (242). Video encoder 20 may also add the filtered view component to reference picture memory 64.

According to aspects of this disclosure, video encoder 20 may assign a layer identifier of the first layer to the filtered layer component (244). Video encoder 20 may also assign a filtered layer component index value to the filtered layer component (246). For example, video encoder 20 may determine a number of representations that are to be generated (e.g., filtered from the first layer). Video encoder 20 may encode one or more syntax elements indicating the number of filtered representations (e.g., a NumRepFromOneBase[i] syntax element). Video encoder 20 may assign layer identifiers (e.g., a layer_id syntax element) sequentially (e.g., based on a LayerIdInterView[i] syntax element, as specified in a VPS) to each filtered layer component.

As noted above, in some examples, video encoder 20 may set syntax elements of a NAL unit header and slice headers of the filtered layer component(s) equal to those of the first layer, unless the video encoder explicitly sets such syntax elements explicitly in the bitstream. Accordingly, according to aspects of this disclosure, if a layer_id of the filtered layer components are not explicitly set, the layer_id may be the same as that of the first layer. In this way, video encoder 20 may identify a layer component by both a layer identifier (layer_id) and a filtered layer component index.

In some examples, after decoding the first layer component, video encoder 20 may set one or more syntax elements associated with the first layer component to indicate that the first layer component is not used as an inter-layer reference picture while decoding an access unit containing the first layer component. After generating the filtered layer component, video encoder 20 may set one or more syntax elements associated with the filtered layer component to indicate that the filtered layer component is used as an inter-layer reference picture while decoding the access unit containing the first layer component.

In some examples, video encoder 20 may set the one or more syntax elements associated with the first layer component by setting an inter_view_flag syntax element to zero. In addition, video encoder 20 may set the one or more syntax elements associated with the filtered layer component by setting an inter_view_flag syntax element to a non-zero value (e.g., one).

In another example, video encoder 20 may, when the first layer component is used for reference and after generating the filtered layer component, mark the first layer component as unused for reference, such that the first layer component is not used as a reference picture for pictures of an access unit containing the first layer component. After decoding the access unit, video encoder 20 may mark the first layer component as one of a short term reference picture and a long term reference picture.

In still another example, video encoder 20 may set one or more syntax elements associated with each layer component of an access unit containing the first layer component and the filtered layer component. In this example, the one or more syntax elements indicate whether the filtered layer component is available for inter-layer prediction, and the one or more syntax elements indicates that the first layer component is not used for inter-layer prediction.

In any case, video encoder 20 may add the filtered layer component to a reference picture set in reference picture memory 64 (248). For example, in the example described above, video encoder 20 may add each of the representations indicated by NumRepFromOneBase[i] into an inter-layer reference picture set. In some instances, the filtered layer components may only be required for coding a current layer component and any other layer components in coding order. Accordingly, video encoder 20 may mark pictures in the inter-layer reference picture set of the previous layer component in coding order as "unused for reference" before a new inter-layer reference picture set is generated.

Video encoder 20 may encode an enhancement layer component relative to the filtered layer component (250). For example, video encoder 20 may use the filtered layer component to perform inter-layer prediction of an enhancement layer component of an enhancement layer. As noted above, the enhancement layer may be combined to with the first layer to provide a higher resolution representation. Video encoder 20 may then output an encoded bitstream including both the base view and the enhancement view (252). In some examples, video encoder 20 may also provide an indication of the filtering technique used to generate the filtered view component.

It should also be understood that the steps shown and described with respect to FIG. 8 are provided as merely one example. That is, the steps of the method of FIG. 8 need not necessarily be performed in the order shown in FIG. 8, and fewer, additional, or alternative steps may be performed.

Figure 9:
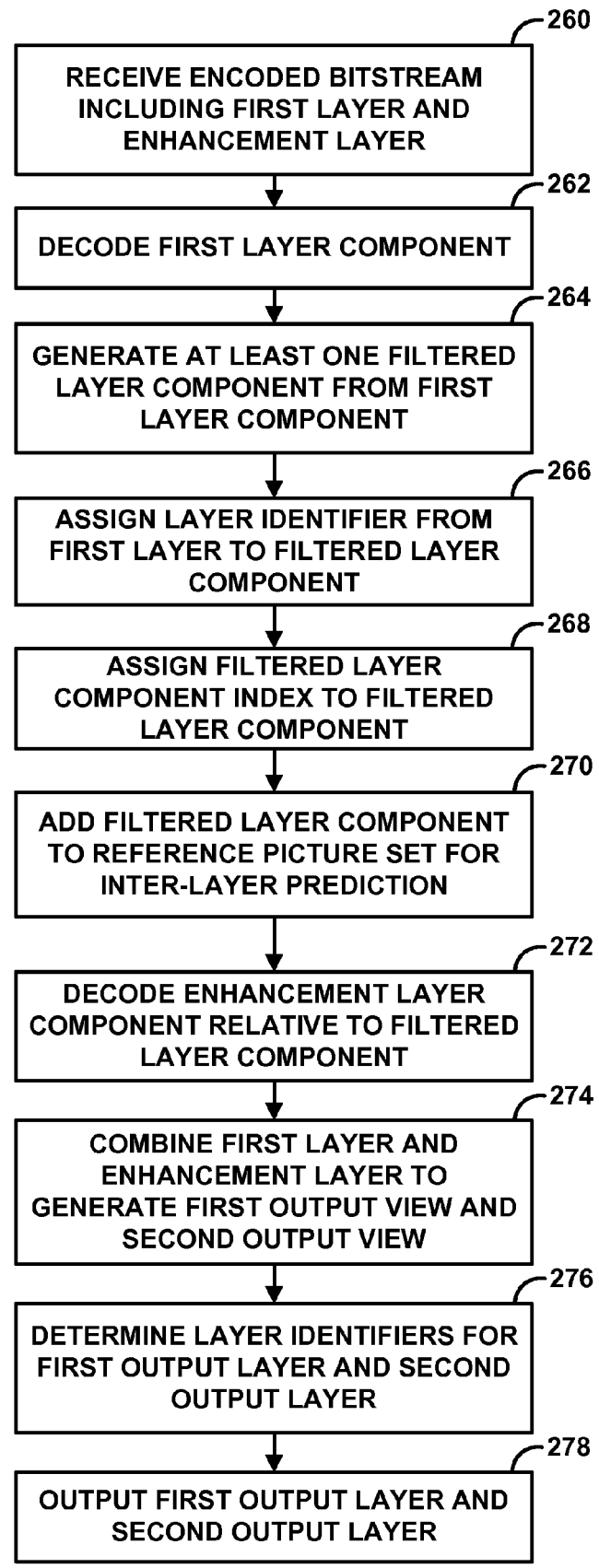
FIG. 9 is a flow diagram illustrating an example method of decoding an MFC bitstream, according to aspects of this disclosure.

FIG. 9 is a flow diagram illustrating an example method of decoding an MFC bitstream. The example shown in FIG. 9 is generally described as being performed by video decoder 30 (FIGS. 1 and 3). However, it should be understood that the process described with respect to FIG. 9 may be carried out by a variety of other processors, processing units, hardware-based coding units such as encoder/decoders (CODECs), and the like.

In the example of FIG. 9, video decoder 30 receives an encoded bitstream that includes a first layer and an enhancement layer (260). For example, in some instances, the first layer may include packed pictures having both a right view and left view pictures. Video decoder 30 may decode the first layer component and add the first layer component to reference picture memory 92 (262). Video decoder 30 also generates at least one filtered layer component from the first layer component of the first layer and adds the filtered layer component to reference picture memory 92 (264).

According to aspects of this disclosure, video decoder 30 may assign a layer identifier of the first layer to the filtered layer component (266). Video decoder 30 may also assign a filtered layer component index value to the filtered layer component (268). For example, video decoder 30 may determine a number of representations that are to be generated (e.g., filtered from the first layer). Video decoder 30 may decode one or more syntax elements indicating the number of filtered representations (e.g., a NumRepFromOneBase[i] syntax element). Video decoder 30 may assign layer identifiers (e.g., a layer_id syntax element) sequentially (e.g., based on a LayerIdInterView[i] syntax element, as specified in a VPS) to each filtered layer component.

As noted above, in some examples, video decoder 30 may set syntax elements of a NAL unit header and slice headers of the filtered layer component(s) equal to those of the first layer, unless such values are explicitly indicated in the bitstream being decoded. Accordingly, according to aspects of this disclosure, if a layer_id of the filtered layer components are not explicitly indicated in the bitstream, video decoder 30 may set the layer_id may to the same value as that of the first layer. In this way, video decoder 30 may identify a layer component by both a layer identifier (layer_id) and a filtered layer component index.

In some examples, after decoding the first layer component, video decoder 30 may set one or more syntax elements associated with the first layer component to indicate that the first layer component is not used as an inter-layer reference picture while decoding an access unit containing the first layer component. After generating the filtered layer component, video decoder 30 may set one or more syntax elements associated with the filtered layer component to indicate that the filtered layer component is used as an inter-layer reference picture while decoding the access unit containing the first layer component.

In some examples, video decoder 30 may set the one or more syntax elements associated with the first layer component by setting an inter_view_flag syntax element to zero. In addition, video decoder 30 may set the one or more syntax elements associated with the filtered layer component by setting an inter_view_flag syntax element to a non-zero value (e.g., one).

In another example, video decoder 30 may, when the first layer component is used for reference and after generating the filtered layer component, mark the first layer component as unused for reference, such that the first layer component is not used as a reference picture for pictures of an access unit containing the first layer component. After decoding the access unit, video decoder 30 may mark the first layer component as one of a short term reference picture and a long term reference picture.

In still another example, video decoder 30 may set one or more syntax elements associated with each layer component of an access unit containing the first layer component and the filtered layer component. In this example, the one or more syntax elements indicate whether the filtered layer component is available for inter-layer prediction, and the one or more syntax elements indicates that the first layer component is not used for inter-layer prediction.

In any case, video decoder 30 may add the filtered layer component to a reference picture set in reference picture memory 64 (270). For example, in the example described above, video decoder 30 may add each of the representations indicated by NumRepFromOneBase[i] into an inter-layer reference picture set. In some instances, the filtered layer components may only be required for coding a current layer component and any other layer components in coding order. Accordingly, video decoder 30 may mark pictures in the inter-layer reference picture set of the previous layer component in coding order as "unused for reference" before a new inter-layer reference picture set is generated.

Video decoder 30 may decode an enhancement layer component relative to the filtered layer component (272). That is, video decoder 30 may use predictive coding to reconstruct enhancement layer information based on residual data received in the bitstream and using the filtered layer component as a reference.

Video decoder 30 may combine layer components of the enhancement layer and layer components of the first layer to generate a first output layer and a second output layer (274). For example, the first output layer and second output layer may include full resolution pictures, including a right-eye full resolution picture and a left-eye full resolution picture, respectively, for the first output layer and the second output layer.

According to aspects of this disclosure, video decoder 30 may determine layer identifiers for the first output layer and the second output layer to aid in determining the appropriate pictures to output (276). For example, as noted above, reference picture memory 92 may include a number of different types of pictures, including pictures of the first layer, enhancement layer pictures, filtered pictures, first output pictures, and second output pictures. Accordingly, the view identifiers for the first output layer and the second output layer may allow video decoder 30 to identify the appropriate layer components for output.

In some examples, video decoder 30 may mark the first output layer component and the second output layer component as unused for reference in the decoded picture buffer. Additionally or alternatively, video decoder 30 may set an inter_view_flag syntax element to zero and a nal_ref_idc syntax element to zero for the first output view component and the second output view component, such that the first output layer component and the second output layer component are not used as reference pictures and are removed from reference picture memory 92 after being output.

In some instances, video decoder 30 may set one or more syntax elements for each of the first output layer component and the second output layer component to indicate that the first output layer component and the second output layer component are to be output. The one or more syntax elements may include an OutputFlag syntax element, such that setting the one or more syntax elements comprises setting the OutputFlag to a non-zero value.

Video decoder 30 may also output the first output layer and the second output layer for display, e.g., by display unit 32 (FIG. 1) (278).

It should also be understood that the steps shown and described with respect to FIG. 9 are provided as merely one example. That is, the steps of the method of FIG. 9 need not necessarily be performed in the order shown in FIG. 9, and fewer, additional, or alternative steps may be performed.

While certain syntax elements described with respect to this disclosure have been provided example names for purposes of explanation, it should be understood that the concepts described in this disclosure are more generally applicable to any syntax elements, regardless of name.

While certain techniques of this disclosure are described with respect to the H.264/AVC standard and modifications to the MVC extension, it should be understood that the techniques are not limited to any particular coding standard. That is, the techniques more generally relate to achieving coding efficiencies in multiview and/or multi-layer video coding, as described above.

A video coder, as described in this disclosure, may refer to a video encoder or a video decoder. Similarly, a video coding unit may refer to a video encoder or a video decoder. Likewise, video coding may refer to video encoding or video decoding, as applicable.

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A device for decoding multilayer video data, the device comprising:
a memory configured to store a current block of video data; and
one or more processors configured to:
determine a first layer component of a first layer of video data, wherein the first layer of video data is associated with a layer identifier that identifies the first layer in the multi-layer video data, and wherein the first layer component is associated with a picture order count (POC) value that identifies the first layer component in the first layer;
generate a filtered layer component by filtering the first layer component;

assign the layer identifier of the first layer and a filtered layer component index to the filtered layer component, wherein the filtered layer component index identifies the filtered layer component in the first layer and is separate from the POC value that identifies the first layer component;

add the filtered layer component to a reference picture set;

perform inter-layer prediction for a current block of video data of a layer other than the first layer of video data to determine a predictive block of video data, wherein performing inter-layer prediction includes identifying the filtered layer component using the layer identifier and the filtered layer component index; and decode residual data from an encoded bitstream and combine the predictive block with the residual data to reconstruct the current block of video data.

2. The device of claim 1, wherein the layer identifier of the first layer comprises a LayerIdInterView[i]syntax element included in a video parameter set (VPS).

3. The device of claim 1,
wherein to generate the filtered layer component, the one or more processors are configured to generate a number of filtered layer components specified by a filtered layer component variable;
wherein to assign the filtered layer component index, the one or more processors are configured to assign an incremental filtered layer component index based on the filtered layer component variable.

4. The device of claim 3, wherein the filtered layer component variable comprises a NumRepFromOneBase[i] syntax element, and wherein the NumRepFromOneBase[i] syntax element is included in one of a video parameter set (VPS), a sequence parameter set (SPS), and a slice header.

5. The device of claim 1, wherein the first layer component is associated with a Network Abstraction Layer (NAL) unit header and a slice header, and wherein the one or more processors are further configured to:
set data of a NAL unit header and a slice header for the filtered layer component equal to data included in a NAL unit header and a slice header of the first layer component.

6. The device of claim 5, wherein the one or more processors are further configured to set data of the NAL unit header and the slice header of the filtered layer component to be different than the NAL unit header and the slice header of the first layer component.

7. The device of claim 1, wherein to generate the filtered layer component, the one or more processors are configured to generate a first filtered layer component, and wherein the one or more processors are further configured to:
decode a first enhancement layer component relative to the first layer component; and
decode a second enhancement layer component relative to the first layer component and without separately generating the first filtered layer component.

8. The device of claim 1, wherein the one or more processors are further configured to mark pictures of a previous reference picture set used for decoding a picture earlier in a decoding order than the first layer component as unused for reference prior to adding the filtered layer component to the reference picture set.

9. The device of claim 1, wherein the first layer component comprises a first view component, and wherein the first view component comprises a packed picture including a right view picture and a view picture.

10. The device of claim 1, wherein the one or more processors are further configured to:
after decoding the first layer component, set one or more syntax elements associated with the first layer component to indicate that the first layer component is not used as an inter-view reference picture while decoding an access unit containing the first layer component; and
after generating the filtered layer component, set one or more syntax elements associated with the filtered layer component to indicate that the filtered layer component is used as an inter-layer reference picture while decoding the access unit containing the first layer component.

11. The device of claim 10,
wherein to set the one or more syntax elements associated with the first layer component, the one or more processors are configured to set an inter_view_flag syntax element to zero; and
wherein to set the one or more syntax elements associated with the filtered layer component, the one or more processors are configured to set an inter_view_flag syntax element to a non-zero value.

12. The device of claim 1, wherein the first layer component is associated with one or more syntax elements in a NAL unit header indicating whether the first layer component is used for reference, and wherein the one or more processors are further configured to:
when the first layer component is used for reference and after generating the filtered layer component, mark the first layer component as unused for reference, such that the first layer component is not used as a reference picture for pictures of an access unit containing the first layer component; and
after coding the access unit, mark the first layer component as one of a short term reference picture and a long term reference picture.

13. The device of claim 1, wherein the one or more processors are further configured to decode one or more syntax elements for each view component of an access unit containing the first layer component and the filtered layer component, wherein the one or more syntax elements indicate whether the filtered layer component is available for inter-layer prediction, and wherein the one or more syntax elements indicate that the first layer component is not used for inter-layer prediction.

14. The device of claim 1, wherein the one or more processors are further configured to:
predict at least a portion of an enhancement layer component from the filtered layer component;
combine the enhancement view component and the first layer component to generate a first output layer component corresponding to a right view picture;
combine the enhancement view component and the first layer component to generate a second output layer component corresponding to a left view picture;
determine a first layer identifier for the first output layer component, wherein the first layer identifier is different than a layer identifier of either of the right view picture and the left view picture; and
determine a second layer identifier for the second output layer component, wherein the second layer identifier is different than a layer identifier of either of the right view picture and the left view picture.

15. The device of claim 14, wherein the one or more processors are further configured to:
store the first output layer component and the second output layer component in a decoded picture buffer; and mark the first output layer component and the second output layer component as unused for reference in the decoded picture buffer.

16. The device of claim 14, wherein the one or more processors are further configured to:
set an inter_view_flag syntax element to zero and a nal_ref_idc syntax element to zero for the first output layer component and the second output layer component, such that the first output layer component and the second output layer component are not used as reference pictures and are removed from a decoded picture buffer after being output.

17. The device of claim 1, wherein a bitstream containing the first layer is a multiview bitstream, and wherein the one or more processors are further configured to identify other views of the multiview bitstream based on one or more syntax elements included in the multiview bitstream, wherein the one or more syntax elements are based on at least one of a decoding order and a reconstruction order of the views.

18. The device of claim 1, wherein the views of the multiview bitstream comprise the first layer, at least one filtered view containing the filtered layer component, and at least one enhancement view, and wherein the one or more processors are further configured to:
assign a filtered view order index to the at least one filtered view that has a value between a view order index of the first layer and a view order index of the at least one enhancement view.

19. The device of claim 1, wherein the one or more processors are further configured to mark the first layer component of the first layer as one or a short-term reference picture and a long-term reference picture.

20. The device of claim 19, wherein the one or more processors are further configured to mark the filtered layer component as a long-term reference picture.

21. The device of claim 1, wherein the filtered layer component includes a first filtered layer component and a second filtered layer component, and wherein the one or more processors are further configured to:
assign a different reference index to each of the first filtered layer component and the second filtered layer component based on a predetermined layer dependency indicated in a video parameter set; and
identify, in a decoded picture buffer, the first filtered layer component and the second filtered layer component based on the respective different reference indexes and a picture order count of the first filtered layer component and the second filtered layer component.

22. An apparatus for encoding multi-layer video data, the apparatus comprising:
a memory configured to store the multi-layer video data; and
one or more processors, the one or more processors configured to:
determine a first layer component of a first layer of video data of the multi-layer video data, wherein the first layer of video data is associated with a layer identifier that identifies the first layer in the multi-layer video data, and wherein the first layer component is associated with a picture order count (POC) value that identifies the first layer component in the first layer;
generate a filtered layer component by filtering the first layer component;
assign the layer identifier of the first layer and a filtered layer component index to the filtered layer component, wherein the filtered layer component index identifies the filtered layer component in the first layer and is separate from the POC value that identifies the layer component;
add the filtered layer component to a reference picture set; and
perform inter-layer prediction for a current block of video data of a layer other than the first layer of video data to generate residual data for the current block of video data, wherein performing inter-layer prediction includes identifying the filtered layer component using the layer identifier and the filtered layer component index; and
encode the residual data in an encoded bitstream.

23. The apparatus of claim 22,
wherein to generate the filtered layer component, the one or more processors are configured to generate a number of filtered layer components specified by a filtered layer component variable;
wherein to assign the filtered layer component index, the one or more processors are configured to assigning an incremental filtered layer component index based on the filtered layer component variable.

24. The apparatus of claim 22, wherein the first layer component is associated with a Network Abstraction Layer (NAL) unit header and a slice header, and wherein the one or more processors are further configured to:
set data of a NAL unit header and a slice header for the filtered layer component equal to data included in a NAL unit header and a slice header of the first layer component.

25. An apparatus for coding multi-layer video data, the apparatus comprising:
means for determining a first layer component of a first layer of video data, wherein the first layer of video data is associated with a layer identifier that identifies the first layer in the multi-layer video data, and wherein the first layer component is associated with a picture order count (POC) value that identifies the first layer component in the first layer;
means for generating a filtered layer component by filtering the first layer component;
means for assigning the layer identifier of the first layer and a filtered layer component index to the filtered layer component, wherein the filtered layer component index identifies the filtered layer component in the first layer and is separate from different than the POC value that identifies the first layer component;
means for adding the filtered layer component to a reference picture set;
means for performing inter inter-layer prediction for a current block of video data of a layer other than the first layer of video data to determine a predictive block of video data, wherein performing inter-layer prediction includes identifying the filtered layer component using the layer identifier and the filtered layer component index; and
means for decoding residual data from an encoded bitstream and combining the predictive block with the residual data to reconstruct the current block of video data.

26. The apparatus of claim 25,
wherein the means for generating the filtered layer component comprises means for generating a number of filtered layer components specified by a filtered layer component variable;

wherein the means for assigning the filtered layer component index comprises means for assigning an incremental filtered layer component index based on the filtered layer component variable.

27. The apparatus of claim 25, wherein the first layer component is associated with a Network Abstraction Layer (NAL) unit header and a slice header, and further comprising:
   means for setting data of a NAL unit header and a slice header for the at least one filtered layer component equal to data included in a NAL unit header and a slice header of the first layer component.

28. A non-transitory computer-readable medium storing instructions that, when executed, cause one or more processors to:
   determine a first layer component of a first layer of video data, wherein the first layer of video data is associated with a layer identifier that identifies the first layer in the multi-layer video data, and wherein the first layer component is associated with a picture order count (POC) value that identifies the first layer component in the first layer;
   generate a filtered layer component by filtering the first layer component;
   assign the layer identifier of the first layer and a filtered layer component index to the filtered layer component, wherein the filtered layer component index identifies the filtered layer component in the first layer and is separate from the POC value that identifies the first layer component;
   add the filtered layer component to a reference picture set;
   perform inter-layer prediction for a current block of video data of a layer other than the first layer of video data to determine a predictive block of video data, wherein performing inter-layer prediction includes identifying the filtered layer component using the layer identifier and the filtered layer component index;
   decode residual data from an encoded bitstream; and
   combine the predictive block with the residual data to reconstruct the current block of video data.

29. The non-transitory computer-readable medium of claim 28,
   wherein to generate the filtered layer component, the instructions cause the one or more processors to generate a number of filtered layer components specified by a filtered layer component variable;
   wherein to assign the filtered layer component index, the instructions cause the one or more processors to assigning an incremental filtered layer component index based on the filtered layer component variable.

30. The non-transitory computer-readable medium of claim 28, wherein the first layer component is associated with a Network Abstraction Layer (NAL) unit header and a slice header, and wherein the instructions further cause one or more processors are to:
   set data of a NAL unit header and a slice header for the filtered layer component equal to data included in a NAL unit header and a slice header of the first layer component.

* * * * *